E

United States Patent
Ben Henda et al.

(10) Patent No.: US 10,848,967 B2
(45) Date of Patent: Nov. 24, 2020

(54) SECURITY ANCHOR FUNCTION IN 5G SYSTEMS

(71) Applicant: Telefonaktiebolaget LM Ericsson (publ), Stockholm (SE)

(72) Inventors: Noamen Ben Henda, Stockholm (SE); David Castellanos Zamora, Madrid (ES); Christine Jost, Lund (SE); Vesa Torvinen, Sauvo (FI); Monica Wifvesson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/421,992

(22) Filed: May 24, 2019

(65) Prior Publication Data
US 2019/0289672 A1 Sep. 19, 2019

Related U.S. Application Data

(63) Continuation of application No. 15/753,354, filed as application No. PCT/EP2017/084029 on Dec. 21, 2017.

(Continued)

(51) Int. Cl.
*H04W 12/04* (2009.01)
*H04W 76/25* (2018.01)
(Continued)

(52) U.S. Cl.
CPC ......... *H04W 12/0401* (2019.01); *H04W 8/12* (2013.01); *H04W 12/00503* (2019.01);
(Continued)

(58) Field of Classification Search
CPC ..... H04W 88/10; H04W 88/06; H04W 12/04; H04W 12/06; H04W 12/04071;
(Continued)

(56) References Cited

U.S. PATENT DOCUMENTS 9,883,385 B2 * 1/2018 Lee ................. H04W 36/0055
10,382,206 B2 8/2019 Muhanna et al.
(Continued)

FOREIGN PATENT DOCUMENTS

RU 2580062 C2 4/2016
WO 2017048434 A1 3/2017

OTHER PUBLICATIONS

"3rd Generation Partnership Project; The Technical Specification Group Services and System Aspects; Study on the security aspects of the next generation system (Release 14)" (3rdGenerationPartnership-ProjectRelease 14), 3GPP TR 33.899, Nov. 25 (Year: 2016).*

(Continued)

*Primary Examiner* — Khoi V Le
(74) *Attorney, Agent, or Firm* — Murphy, Bilak & Homiller, PLLC

(57) ABSTRACT

A method for handling change of serving Access and Mobility Managing Function for a user equipment. The method comprises sending of a context request to a source Access and Mobility Managing Function. This sending is performed from a target Access and Mobility Managing Function. In the target Access and Mobility Managing Function, a context is received (S3) in reply from the source Access and Mobility Managing Function. The context comprises a parameter which identifies a Security Anchor Function Access and Mobility Managing Function. The Security Anchor Function Access and Mobility Managing Function keeps a key, which is shared with the user equipment. A method for handling a change of serving Access and Mobility Managing Function in a user equipment is also disclosed as well as Access and Mobility Managing Function and User Equipments therefore.

8 Claims, 16 Drawing Sheets

Related U.S. Application Data

(60) Provisional application No. 62/451,856, filed on Jan. 30, 2017.

(51) Int. Cl.
  *H04W 8/12* (2009.01)
  *H04W 60/00* (2009.01)
  *H04W 88/06* (2009.01)
  *H04W 88/10* (2009.01)
  *H04W 12/00* (2009.01)
  *H04W 36/00* (2009.01)
  *H04W 12/06* (2009.01)

(52) U.S. Cl.
  CPC ............... *H04W 12/04033* (2019.01); *H04W 12/04071* (2019.01); *H04W 12/0609* (2019.01); *H04W 36/0038* (2013.01); *H04W 60/00* (2013.01); *H04W 76/25* (2018.02); *H04W 88/06* (2013.01); *H04W 88/10* (2013.01)

(58) Field of Classification Search
  CPC ... H04W 12/0401; H04W 60/00; H04W 8/12; H04W 76/25
  See application file for complete search history.

(56) References Cited

U.S. PATENT DOCUMENTS

| | | | |
|---|---|---|---|
| 10,694,434 | B2 | 6/2020 | Ryu et al. |
| 2008/0181411 | A1 | 7/2008 | Naeslund et al. |
| 2011/0021216 | A1 | 1/2011 | Pudney et al. |
| 2012/0184284 | A1 | 7/2012 | Moisio et al. |
| 2017/0264439 | A1 | 9/2017 | Muhanna et al. |
| 2018/0013568 | A1 | 1/2018 | Muhanna et al. |
| 2018/0063707 | A1 | 3/2018 | Lee et al. |
| 2018/0132096 | A1 | 5/2018 | Huo |
| 2018/0192337 | A1 | 7/2018 | Ryu et al. |
| 2019/0174573 | A1 | 6/2019 | Velev et al. |
| 2019/0253888 | A1 | 8/2019 | Jerichow et al. |
| 2019/0261178 | A1 | 8/2019 | Rajadurai et al. |
| 2019/0261180 | A1 | 8/2019 | Lei et al. |
| 2019/0288851 | A1 | 9/2019 | Muhanna et al. |
| 2019/0342082 | A1 | 11/2019 | Lei et al. |
| 2019/0373461 | A1 | 12/2019 | Ito et al. |
| 2020/0059783 | A1 | 2/2020 | Wifvesson |
| 2020/0120570 | A1 | 4/2020 | Youn et al. |

OTHER PUBLICATIONS

3GPP, "3rd Generation Partnership Project; Technical Specification Group Services and System Aspects; Study on the security aspects of the next generation system (Release 14)", 3GPP TR 33.899 V0.6.0, Nov. 2016, 375 pages.

Unknown, Author, "3rd Generation Partnership Project; Technical Specification Group Services and System Aspects; Rationale and track of security decisions in Long Term Evolved (LTE) RAN / 3GPP System Architecture Evolution (SAE) (Release 9)", 3GPP TR 33.821 V9.0.0, Jun. 2009, 141 pages.

Unknown, Author, "Update of Solution #136 for SEAF Realization via AMF", 3GPP TSG SA WG3 (Security) Meeting #87, S3-171591, Ljubljana, Slovenia, May 15-19, 2017, 4 pages.

* cited by examiner

Fig. 5
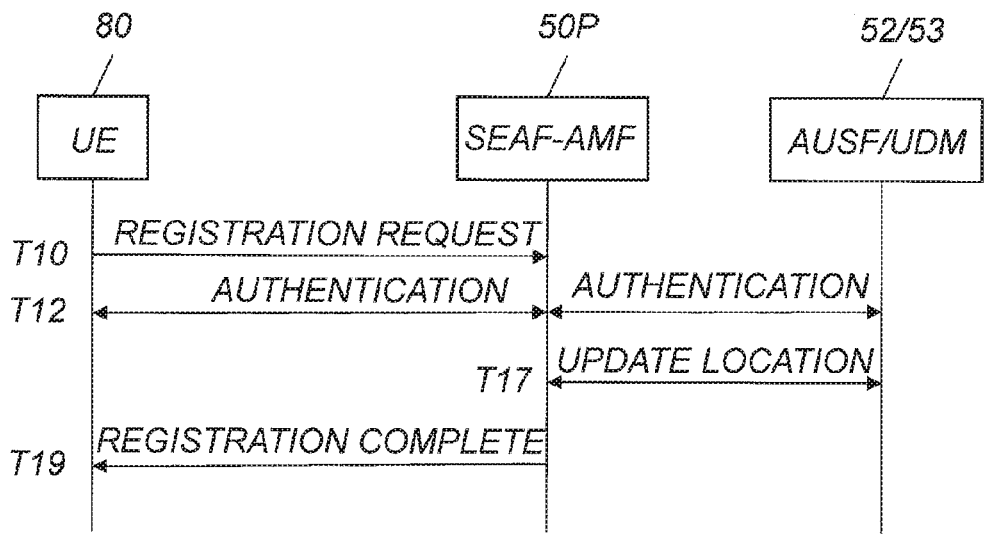
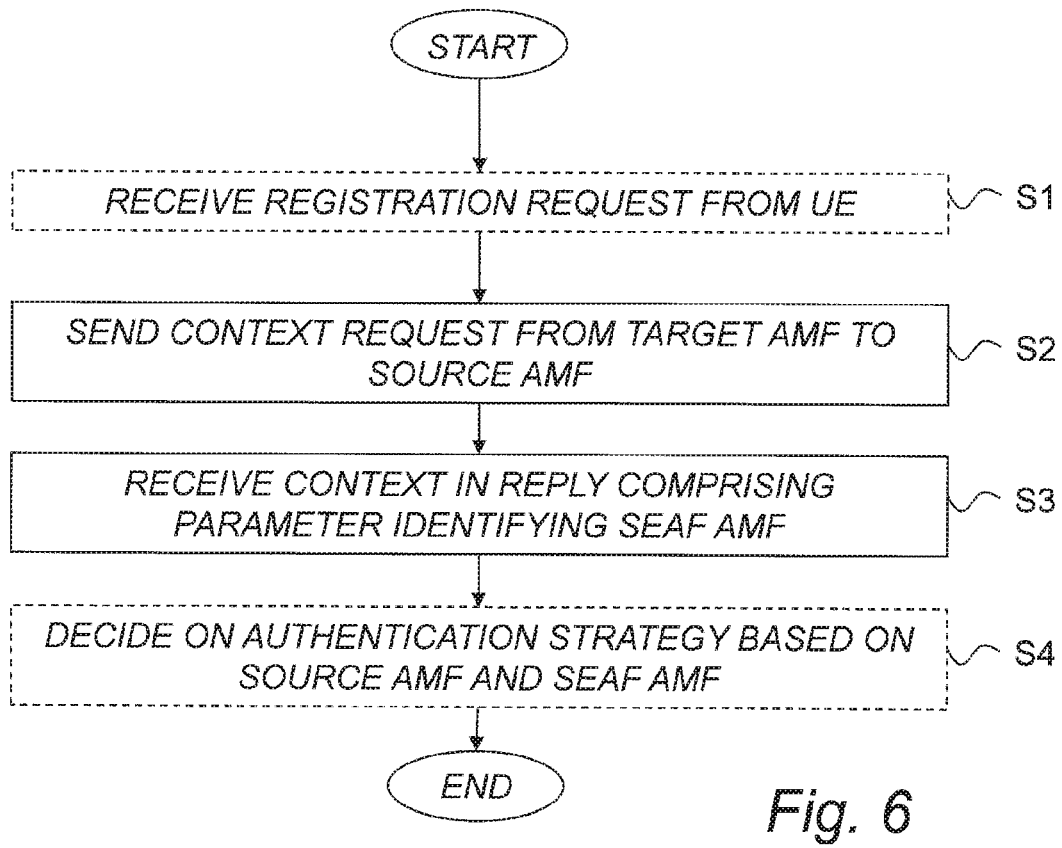
Fig. 6

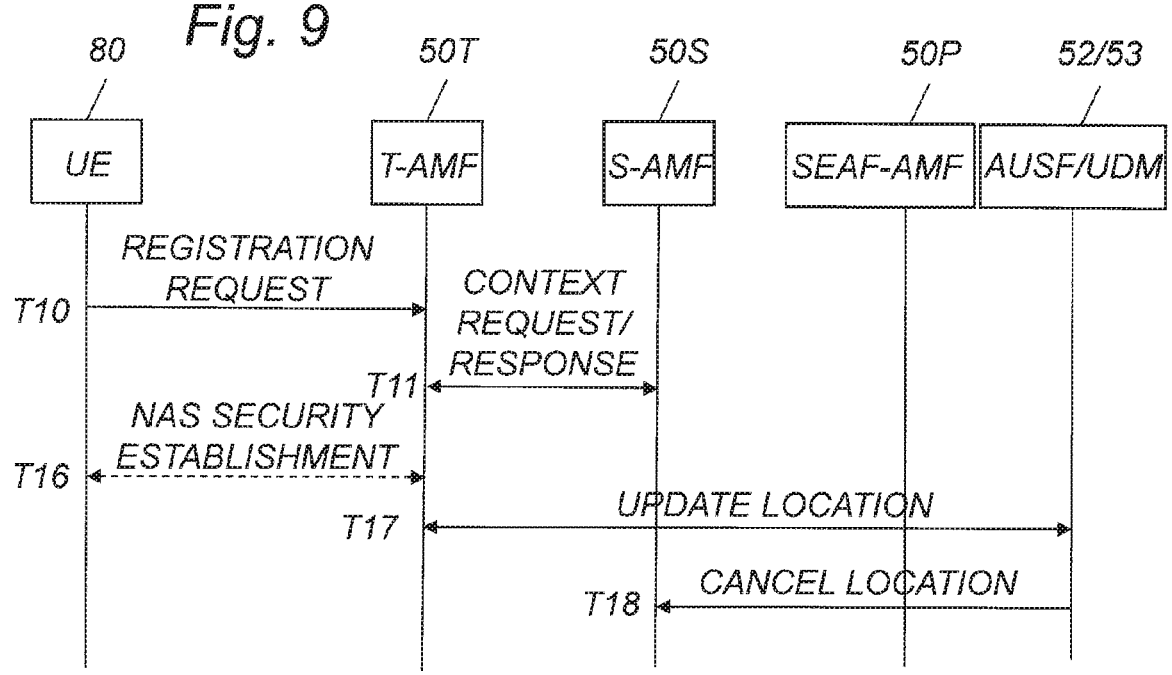
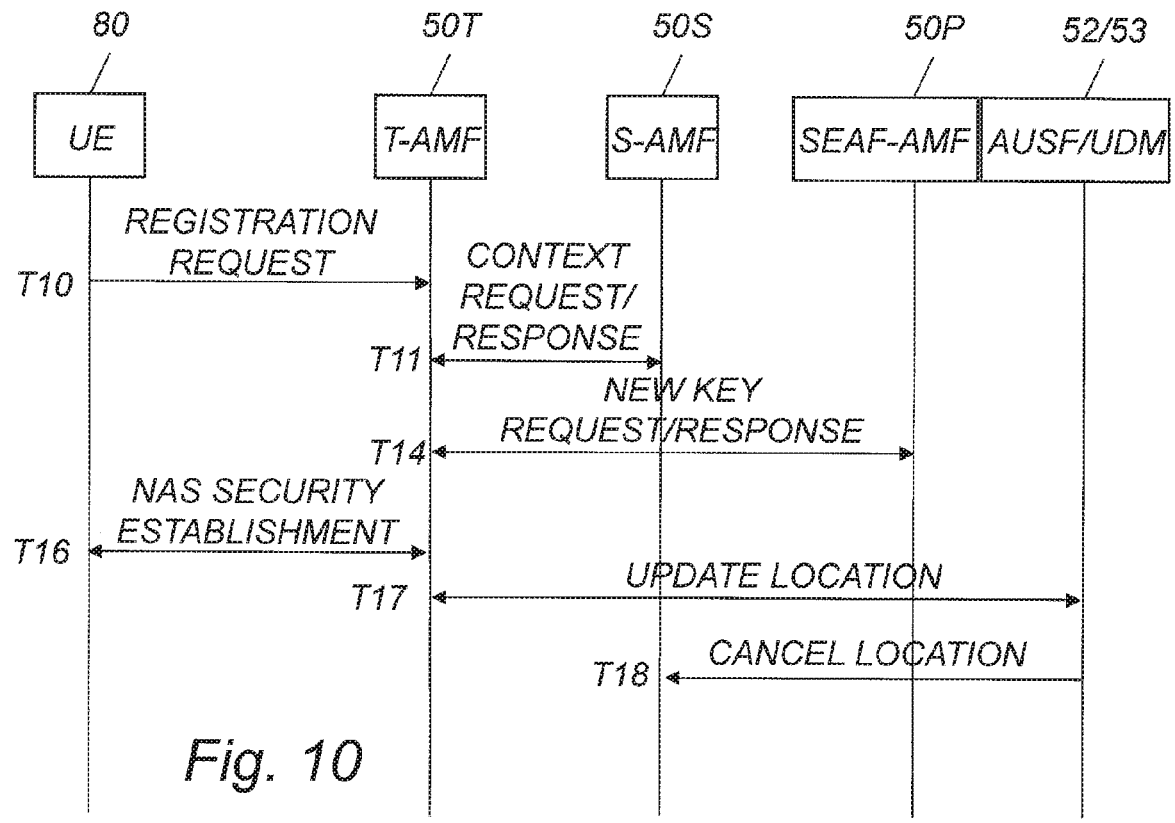

SECURITY ANCHOR FUNCTION IN 5G SYSTEMS

RELATED APPLICATIONS

This application is a continuation of and claims the benefit of and priority to U.S. patent application Ser. No. 15/753,354 filed 19 Feb. 2018, which is a U.S. National Phase Application of PCT/EP2017/084029 filed 21 Dec. 2017, which claims benefit of the U.S. Provisional Application No. 62/451,856 filed 30 Jan. 2017. The entire contents of each aforementioned application is incorporated herein by reference.

TECHNICAL FIELD

The proposed technology generally relates to security issues in a 5G communication system.

BACKGROUND

The 3rd Generation Partnership Project (3GPP) is a collaboration between groups of telecommunications associations. The initial object of 3GPP was to agree on a globally applicable third-generation (3G) mobile phone system specification. The scope was later enlarged to include the development and maintenance of further generations of mobile telecommunication generations, e.g. the Universal Mobile Telecommunications System (UMTS) architecture, sometimes also referred to as 3G, and the Long Term Evolution (LTE) architecture also referred to as fourth-generation (4G).

3GPP is currently developing the standards for 5G a.k.a. Next Generation (NG). This future generation of wireless communications, commonly referred to as Next Generation (NextGen or NG), Next Generation System (NGS) or 5G, is being developed all over the world, although no common 5G standard has yet been set.

The vision of Next Generation wireless communications lies in providing very high data rates, extremely low latency, manifold increase in base station capacity, and significant improvements of user perceived Quality of Service (QoS), compared to current 4G LTE networks.

It is expected that 5G will support many new scenarios and use cases and will be an enabler for the Internet of Things (IoT). It is expected that NO systems will provide connectivity to a wide range of new devices such as sensors, smart wearables, vehicles, machines, etc. Flexibility would be then a key property in NG Systems. This is reflected in the security requirement for network access that are mandating the support of alternative authentication methods and different types of credentials than the usual Authentication and Key Agreement (AKA) credentials pre-provisioned by the operator and securely stored in the Universal Integrated Circuit Card (UICC). This would allow factory owners or enterprises to leverage their own identity and credential management systems for authentication and access network security.

Among the new security features in NG Systems is the introduction of a Security Anchor Function (SEAF). The sole purpose of the SEAF is to cater for the flexibility and dynamicity in the deployment of the NG Core Network functions. In fact, the NO Systems will leverage virtualization to achieve such properties. As a consequence, the scenario where the Access and Mobility Management Function (AMF) is deployed in a domain that is potentially less secure than within for example the operator premises, is not only plausible but is to be expected.

The SEAF is supposed to establish and share a key with the User Equipment (UE) (called Kseaf) that is used for deriving any other keys such as for the control plane protection (Kcn) and the radio interface protection. These keys would correspond in 4G systems to the Non-Access Stratum (NAS) keys and the KeNB. The SEAF is then assumed to reside in a secure location and the Kseaf would never leave the SEAF. One major advantage of this setting would be to avoid re-authentication each time the UE goes idle and then active again. In fact, authentication is a costly procedure in particular when the UE is roaming.

During the architectural study of NG systems, it was decided that the SEAF and AMF are collocated. This does actually defeat the purpose of such an additional security function in the first place. Is there still a need for a SEAF and if yes how can it be implemented? It is worth noticing that the security design in legacy systems was conceptually based on the assumption that the Mobility Management Entity (MME) is always located in a secure location within the operator CN. This assumption does not apply to AMF. In dense areas, an AMF could be deployed closer to the edge of the network, e.g. in a shopping mall, and thus potentially in exposed locations. Therefore, during an AMF change it is possible that the AMFs are not located in equally secure domains and therefore the target or the source AMF might need to shield itself from the other one.

Reusing legacy mechanism is not sufficient in such new security settings as explained below. In Evolved Packet Systems (EPS), the equivalent of AMF is MME. During an MME change, the new MME fetches the security context of the UE from the old MME. In addition, an MME has always the possibility to trigger a new authentication.

With legacy mechanisms, forward security could be achieved via re-authentication but there is no mechanism for backward security. More precisely, on the target side, the new AMF has always the possibility to trigger a new authentication thus cutting short any possibility for the old AMF to determine the used keys. The need for re-authentication could be for example based on an operator policy taking into account the location of the different AMFs.

Relying solely on the authentication procedure is not very efficient since, performance wise, it is one of the heaviest procedures. This is where an independent SEAF could have played a major role by removing the need for re-authentication especially when roaming.

SUMMARY

It is an object to provide an authentication procedure upon change of AMF that is efficient and allows for forward security.

This and other objects are met by embodiments of the proposed technology.

According to a first aspect, there is provided a method for supporting handling of change, of serving AMF for a user equipment. The method comprises sending of a context request to a source AMF. This sending is performed from a target AMF. In the target AMF, a context is received in reply from the source AMF. The context comprises a parameter which identifies a SEAF AMF. The SEAF AMF keeps a key, which is shared with the user equipment.

According to a second aspect, there is provided a method for supporting handling of change of serving AMF for a user equipment. The method comprises receiving of a context request from a target AMF. The receiving is performed in a source AMF. A context is sent from the source AMF in reply, to the target AMF. The context comprises a parameter which identifies a SEAF AMF. The SEAF AMF keeps a key, which is shared with the user equipment.

According to a third aspect, there is provided a method for supporting handling of change of serving AMF for a user equipment. The method comprises sending of a registration request to a target AMF. The sending is performed from the user equipment. A non-access stratum security establishment procedure between said target AMF and said user equipment is performed. The non-access stratum security establishment procedure informs the user equipment about an authentication strategy decided by the target AMF. Key procedures are applied according to the authentication strategy.

According to a fourth aspect, there is provided a method for supporting handling of change of serving AMF for a user equipment. The method comprises receiving of a request from a target AMF for a new key for the user equipment. The receiving is performed in a SEAF AMF. In the SEAF AMF, a new core network key is derived from a key that is shared with the user equipment. The new core network key is sent to the target AMF.

According to a fifth aspect, there is provided a network node configured to support handling of change of serving AMF for a user equipment. The network node comprises an AMF configured to send a context request to a source AMF. The AMF is configured to receive a context in reply from the source AMF. The context comprises a parameter which identifies a SEAF AMF. The SEAF AMF keeps a key, which is shared with the user equipment.

According to a sixth aspect, there is provided a network node configured to support handling of change of serving AMF for a user equipment. The network node comprises an AMF configured to receive a context request from a target AMF. The AMF is configured to send a context in reply to the target AMF. The context comprises a parameter which identifies a SEAF AMF. The SEAF AMF keeps a key, which is shared with the user equipment.

According to a seventh aspect, there is provided a user equipment for use in a communication network. The user equipment is configured for sending a registration request to a target AMF. The user equipment is further configured for performing a non-access stratum security establishment procedure between the target AMF and the user equipment. The non-access stratum security establishment procedure informs the user equipment about an authentication strategy decided by the target AMF. The user equipment is further configured for applying key procedures according to the authentication strategy.

According to an eighth aspect, there is provided a network node configured to support handling of change of serving AMF for a user equipment. The network node comprises an AMF configured to receive a request from a target AMF for a new key for the user equipment. The AMF is further configured to derive a new core network key from a key that is shared with the user equipment. The AMF is further configured to send the new core network key to the target AMF.

According to a ninth aspect, there is provided a computer program comprising instructions, which when executed by at least one processor, cause the processor(s) to send, from a target AMF, a context request to a source AMF. The computer program comprises further instructions, which when executed by the processor(s), cause the processor(s) to receive, in the target AMF, a context in reply from the source AMF. The context comprises a parameter which identifies a SEAF AMF. The SEAF AMF keeps a key, which is shared with the user equipment.

According to a tenth aspect, there is provided a computer program comprising instructions, which when executed by at least one processor, cause the processor(s) to receive, in a source AMF, a context request from a target AMF. The computer program comprises further instructions, which when executed by the processor(s), cause the processor(s) to send, from the source AMF, a context in reply to the target AMF. The context comprises a parameter which identifies a SEAF AMF. The SEAF AMF keeps a key, which is shared with the user equipment.

According to an eleventh aspect, there is provided a computer program comprising instructions, which when executed by at least one processor, cause the processor(s) to send a registration request to a target AMF. The computer program comprises further instructions, which when executed by the processor(s), cause the processor(s) to perform a non-access stratum security establishment procedure between the target AMF and the user equipment. The non-access stratum security establishment procedure informs the user equipment about an authentication strategy decided by the target AMF. The computer program comprises further instructions, which when executed by the processor(s), cause the processor(s) to apply key procedures according to the authentication strategy.

According to a twelfth aspect, there is provided a computer program comprising instructions, which when executed by at least one processor, cause the processor(s) to receive, in a SEAF AMF, a request from a target AMF for a new key for the user equipment. The computer program comprises further instructions, which when executed by the processor(s), cause the processor(s) to derive, in the SEAF AMF, a new core network key from a key that is shared with the user equipment. The computer program comprises further instructions, which when executed by the processor(s), cause the processor(s) to send the new core network key to the target AMF.

According to a thirteenth aspect, there is provided a computer-program product comprising a computer-readable medium having stored thereon a computer program according to any of the ninth to twelfth aspects.

According to a fourteenth aspect, there is provided a carrier comprising a computer program according to any of the ninth to twelfth aspects, wherein the carrier is an electronic signal, an optical signal, an electromagnetic signal, a magnetic signal, an electric signal, a radio signal, a microwave signal, or a computer-readable storage medium.

According to a fifteenth aspect, there is provided a network node for supporting handling of change of serving AMF for a user equipment. The network node comprises a transmitter module for sending, from a target AMF, a context request to a source AMF. The network node further comprises a receiver module for receiving, in the target AMF, a context in reply from the source AMF. The context comprises a parameter which identifies a SEAF AMF. The SEAF AMF keeps a key, which is shared with the user equipment.

According to a sixteenth aspect, there is provided a network node for supporting handling of change of serving AMF for a user equipment. The network node comprises a receiver module for receiving, in a source AMF, a context request from a target AMF. The network node further comprises a transmitter for sending, from the source AMF, a context in reply to the target AMF. The context comprises a parameter which identifies a SEAF AMF. The SEAF AMF keeps a key, which is shared with the user equipment.

According to a sixteenth aspect, there is provided a user equipment for use in a communication network. The user equipment comprises a transmitter for sending of a registration request to a target AMF. The user equipment further comprises a security module for performing a non-access stratum security establishment procedure between the target AMF and the user equipment. The non-access stratum security establishment procedure informs the user equipment about an authentication strategy decided by the target AMF. The user equipment further comprises a key handling module for applying key procedures according to the authentication strategy.

According to a seventeenth aspect, there is provided a network node for supporting handling of change of serving AMF for a user equipment. The network node comprises a receiver for receiving of a request from a target AMF for a new key for the user equipment. The network node further comprises a key managing module for deriving a new core network key from a key that is shared with the user equipment. The network node further comprises a transmitter for sending the new core network key to the target AMF.

The solution does not require an independent SEAF function and saves on the need for standardized interfaces, complexity and additional signaling within the core network.

The solution addresses the security issues introduced by the flexibility in the AMF deployment by providing an efficient alternative to authentication for forward security.

Other advantages will be appreciated when reading the following description.

BRIEF DESCRIPTION OF THE DRAWINGS

The embodiments, together with further objects and advantages thereof, may best be understood by making reference to the following description taken together with the accompanying drawings, in which:

FIG. 5 describes signaling of an embodiment for authentication during initial registration;

FIG. 6 illustrates a flow diagram of steps of an embodiment of a method for handling change of serving AMF for a UE, in the role of a target AMF;

FIG. 9 describes signaling of an embodiment of the target AMF continuing using the security keys received from the source AMF;

FIG. 10 describes signaling of an embodiment comprising a new key derivation;

DETAILED DESCRIPTION

Throughout the drawings, the same reference designations are used for similar or corresponding elements.

It may be useful to start with a very brief overview of the Universal Mobile Telecommunications System (UMTS) architecture, sometimes also referred to as 3G, and the Long Term Evolution (LTE) architecture also referred to as 4G.

To start with, the Radio Access Network (RAN) part of the architectures differs in that Universal Terrestrial Radio Access Network (UTRAN) is the 3G UMTS RAN and Evolved UTRAN (eUTRAN) is the LTE RAN. UTRAN supports both circuit switched and packet switched services while eUTRAN only supports packet switched services.

The UTRAN air interface is Wideband Code Division Multiple Access (WCDMA) based on spread spectrum modulation technology while eUTRAN employs a multi-carrier modulation scheme called Orthogonal Frequency Division Multiple Access (OFDMA). High Speed Packet Access (HSPA) is a set of protocols that extend and improve the performance of existing 3G UMTS networks using the WCDMA protocol.

In 3G UMTS, the RAN is based on two types of nodes: the access node or base station called NodeB and the Radio Network Controller (RNC). The RNC is the node controlling the RAN, and it also connects the RAN to the Core Network (CN).

Figure 1:
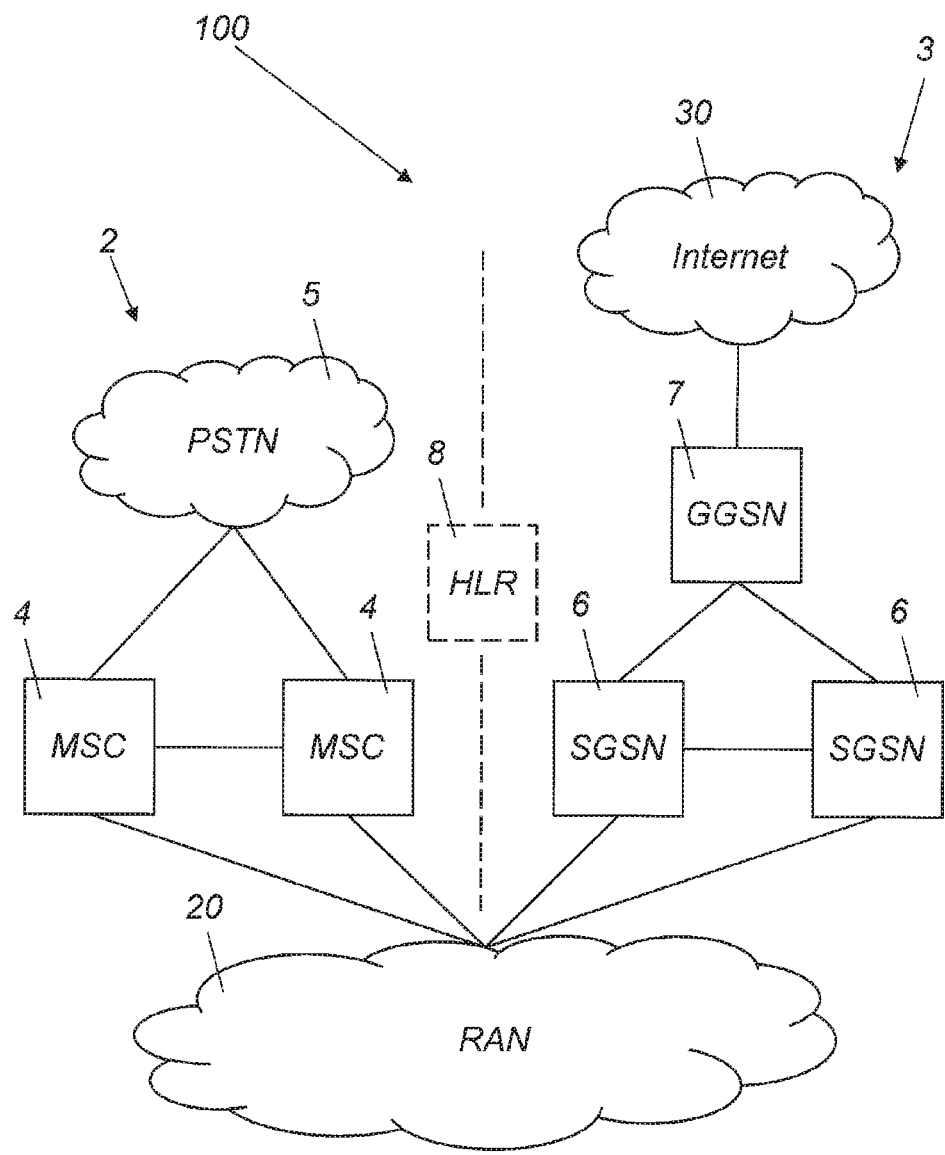
FIG. 1 is a schematic diagram illustrating a simplified overview of a core network for UMTS.

FIG. 1 is a schematic diagram illustrating a simplified overview of the core network for UMTS 100. The core network for UMTS/WCDMA includes:

the Circuit-Switched (CS) domain 2 with the Mobile Switching Center (MSC) 4 for connection to the Public Switched Telephone Network (PSTN) 5;

the Packet-Switched (PS) domain 3 with the Serving GPRS Support Node (SGSN) 6 for connection to the RAN 20, and the Gateway GPRS Support Node (GGSN) 7 for connection to external networks, such as the Internet 30.

Common for the two domains is the Home Location register (HLR) 8, a database in the home operator's network that keeps track of the subscribers of the operator.

A key design philosophy of the LTE RAN is to use only one type node, the evolved Node B, also referred to as eNodeB car eNB. A key concept of the LTE CN is to be independent of the radio access technology to the extent possible. The LTE RAN functions usually involve:

Coding, interleaving, modulation and other typical physical layer functions;
Automatic Repeat request (ARQ) header compression and other typical link layer functions;
User Plane (UP) security functions, e.g., ciphering, and RAN signaling security, e.g., ciphering and integrity protection of RAN originated signaling to the UE; and
Radio Resource Management (RRM), handover, and other typical radio resource control functions.

The LTE CN functions usually involve:
Non-Access Stratum (NAS) security functions, e.g. ciphering and integrity protection of CN signaling to the UE;
Subscriber management;
Mobility management;
Bearer management and Quality of Service (QoS) handling;
Policy control and user data flows;
Interconnection to external networks.

The evolution and standardization of the LTE CN was called the System Architecture Evolution (SAE) and the core network defined in SAE differs radically from the older generation core network and was therefore named the Evolved Packet Core (EPC).

Figure 2:
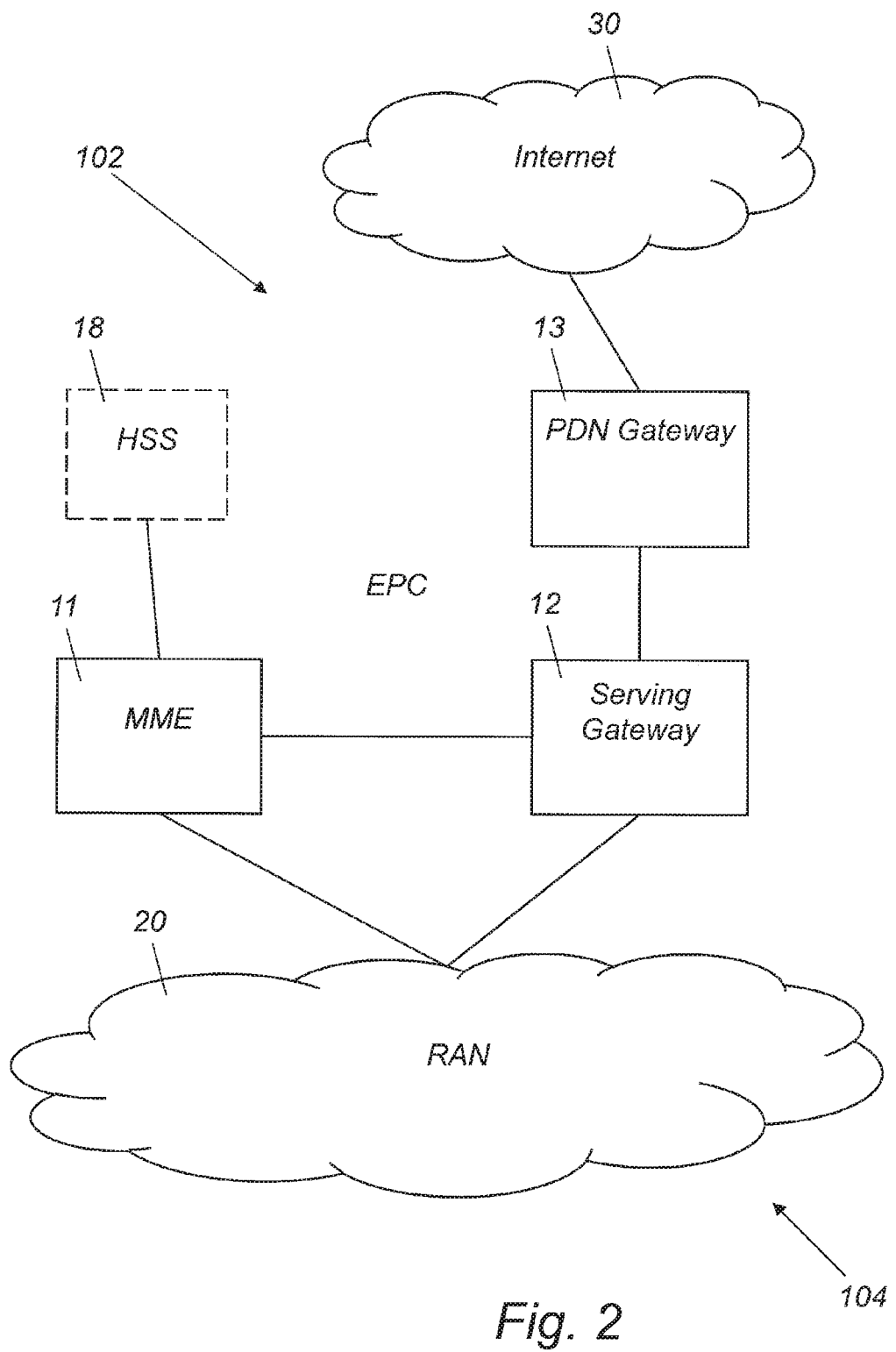
FIG. 2 is a schematic diagram illustrating a simplified overview of the EPC architecture.

FIG. 2 is a schematic diagram illustrating a simplified overview of the EPC 102 architecture. The basic nodes of the EPC 102 include:

the Mobility Management Entity (MME) 11, which is the control plane node of the EPC 102;
the Serving Gateway (SG) 12, which is the user plane node connecting the EPC 102 to the LTE RAN 20; and
the Packet Data Network Gateway (PDN) Gateway 13, which is the user plane node connecting the EPC 102 to the Internet 30.

The MME is normally also connected to a Home Subscriber Server (HSS) 18, which is a database node corresponding to the HLR.

The Serving Gateway 12 and the PDN Gateway 13 may be configured as a single entity.

Sometimes the EPC 102 together with the LTE RAN 20 is denoted Evolved Packet System (EPS) 104.

As mentioned further above, it is expected that 5G will provide connectivity to a wide range of new devices such as sensors, smart wearables, vehicles, machines, etc. Flexibility would be then a key property in NG Systems.

Figure 3:
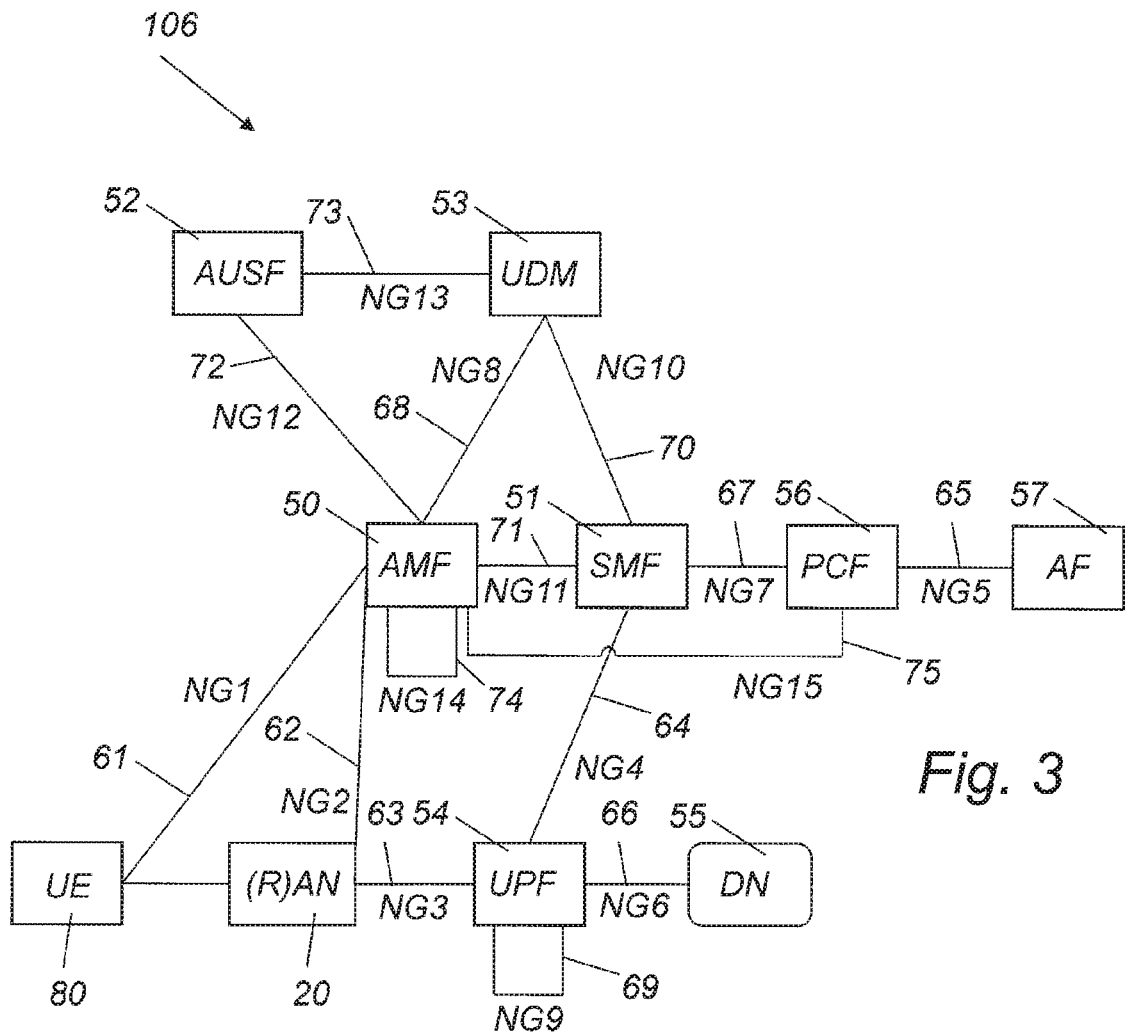
FIG. 3 is a schematic illustration of an embodiment of a non-roaming architecture of a 5G system.

3GPP SA2 has agreed on the non-roaming architecture 106 illustrated in FIG. 3 in their study in TR 23.799.

The Access and Mobility management Function (AMF) 50, sometimes referred to as and/or comprising the Mobility Management Function, MMF, Core Network Mobility Management (CN-MM) or simply Mobility Management (MM), is the core network node that supports mobility management and is, thus, playing a similar role to the MME in EPC. AMF 50 has a so-called NG2 interface 62 to RAN 20 that corresponds to the so-called S1 interface between MME and RAN in EPC, AMF 50 has a so-called NG1 interface 61 to the UEs 80. The AMF 50 is furthermore connected to a Session Management Function (SMF) 51 over a NG11 interface 71.

When different AMFs 50 communicate with each other, this is performed over a NG14 interface 74.

An Authentication Server Function (AUSF) 52 is responsible for the primary authentication process and communicates with the AMF 50 of a NG12 interface 72. A User Data Management (UDM) 53 communicates with the AUSF 52 via a NG13 interface 73, with the AMF 50 via a NG8 interface 68, and with the SMF 51 via a NG10 interface 70.

The proposed solution implements the concept of SEAF by assimilating that role (status) the AMF 50 where the UE 80 authenticates first. It is then kept track of the SEAF AMF (also called primary AMF) via an additional Global Unique Temporary ID (GUTI) like parameter, called primary GUTI (PGUTI), in the security context. The primary GUTI would be then passed along any other security parameters between AMFs 50 during an AMF change. The target AMF could then use that parameter to identify the primary AMF (playing the role of the SEAF for that particular UE 80) and queries it for new CN keys in case for example it doesn't entirely trust the source AMF 50.

A User Plane Function (UPF) 54 is further connected to the RAN 20 by a NG3 interface 63, to the SWF 51 by a NG4 interface 64, and to different Data Networks (DN) 55 by NG6 interfaces 66.

When different UPFs 54 communicate with each other, this is performed over a NG9 interface 69.

A Policy Control Function (PCF) 65 is connected to the SMF 51 via a NG7 interface 67, with the AMF 50 via a NG 15 interface 75 and with Applications Functions (AF) 57 via a NGS interface 65.

The SEAF shares a key with the UE denoted by Kseaf. This key is the result of the primary authentication procedure for network access between the UE and the AUSF via the SEAF/AMF. The Kseaf is the equivalent of the Kasme in the legacy systems and will serve as the root key for the derivation of the CN and AN keys. Whenever available, the Kseaf could be used to avoid a full re-authentication. It is proposed then that the Kseaf never leaves the AMF where the UE authenticates.

Figure 4:
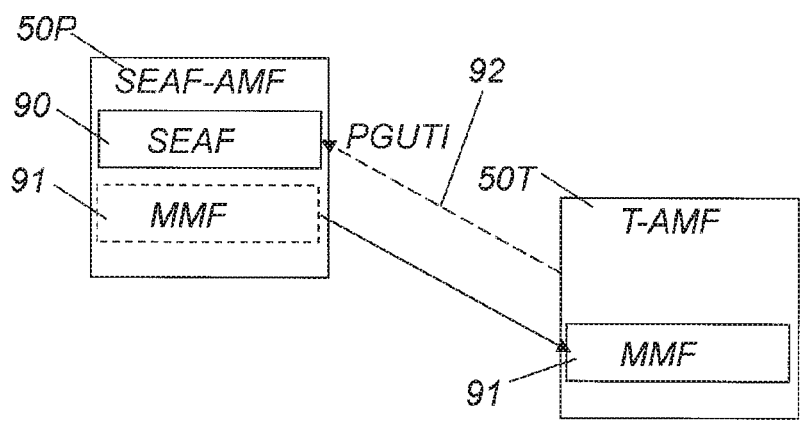
FIG. 4 is a schematic illustration of the relationship between a target AMF and SEAF AMF.

Abusing terminology somewhat, the term MMF is used here to refer to the non-SEAF role part of the AMF. Now from the UE perspective, an AMF could endorse the role of the SEAF, the role of the MMF or both. With reference to FIG. 4, when the UE authenticates first with a particular AMF 50P, that AMF 50P endorses both roles, i.e. the SEAF 90 and the MMF 91. Such an AMF will be henceforth referred to as the SEAF AMF (of the UE), here denoted as P-AMF 50P. When the UE later moves to another target AMF, T-AMF 50T (e.g. in case of a mobility event), the target AMF 50 T endorses only the role of the MMF 91 while the SEAF AMF 50P endorses the role of the SEAF 90. If a UE is re-authenticated by other than the SEAF AMF, then the new AMF becomes the SEAF one and a new Kseaf is taken into use.

The SEAF AMF will always be in possession of the Kseaf until the UE authenticates somewhere else. The serving AMF, i.e. originally the SEAF AMF or the target AMF after a change, will always have the CN key (key used for deriving the NAS protocol keys). Therefore, for any UE, it can be the case that two different AMFs are involved in maintaining and sharing some form of a security context with the same UE. The SEAF AMF 50P will maintain the SEAF 90 context based on the Kseaf and the serving AMF, e.g. a target AMF 50T, the CN security context based on a derived key called Kcn. The UE maintains both contexts. Observe that it is possible that the SEAF AMF is also the serving AMF in that case it maintains both contexts. In order for this to work, some form of an additional AMF identifier must be included in the CN security context to identify the SEAF AMF for example this could be like an additional GUTI-like parameter that uniquely identifies the AMF and the UE. In the remainder of the description, such an identifier 92 is referred to as the Primary GUTI (PGUTI).

For enabling security context handling during initial registration, the initial registration is handled as in the baseline and is depicted in the FIG. 5. A registration request T10 is sent from the UE 80 to an AMF, i.e. a SEAF AMF 50P. The P-AMF 50P decides to manage an authentication T12 involving the AUSF 52 and the UE 80 leading to the establishment of a Kseaf. As a consequence, the AMF becomes the SEAF AMF 50P for this UE 80. As a consequence, a Kseaf' is established. The corresponding PGUTI could be for example chosen to be the first GUTI allocated by this SEAF AMF 50P.

The only consideration regarding the mechanisms proposed here is that the AMF receiving the initial registration request thus becomes the SEAF AMF 50P supporting the SEAF role. Therefore, after subscription authentication, the SEAF AMF 50P will receive and keep a Kseaf from the AUSF 52 of the HPLMN.

After successful authentication and Kseaf delivery, the (SEAF) AMF 50P will perform an Update Location T17 to register itself in the UDM 53 of the HPLMN and to download the subscription profile of the authenticated user.

The procedure is ended by the SEAF AMF 50P informing T19 the UE 80 about that the registration is complete.

Security context handling during AMF change requires further considerations. An AMF change could typically occur during mobility events. In legacy systems, the security context is transferred between the MMEs. In NG systems, there will be always some kind of context transfer between the target and source AMF. However, for the security aspect, several scenarios are possible depending on which security parameters are transferred and how they are taken into use. During system operations, which decision the new AMF, also referred to as the target AMF, takes could be based on a security policy for example depending on the location of the old AMF, also referred to as the source AMF, and the SEAF AMF.

FIG. 6 illustrates a flow diagram of steps of an embodiment of a method for supporting handling of change of serving AMF for a UE. In step S2, a context request is sent from a target AMF to a source AMF. In step S3, a context is received in the target AMF in reply from the source AMF. The context comprises a parameter which identifies a SEAF AMF. The SEAF AMF keeps a key, which is shared with the UE.

In a preferred embodiment, step S2 is preceded by a step S1, in which a registration request is received from the UE In a preferred embodiment, in step S4 an authentication strategy is decided on based on a situation of at least one of the source AMF and the SEAF AMF. Even more preferably, the deciding is based on a security policy depending on the location of the source AMF and the SEAF AMF.

Figure 7:
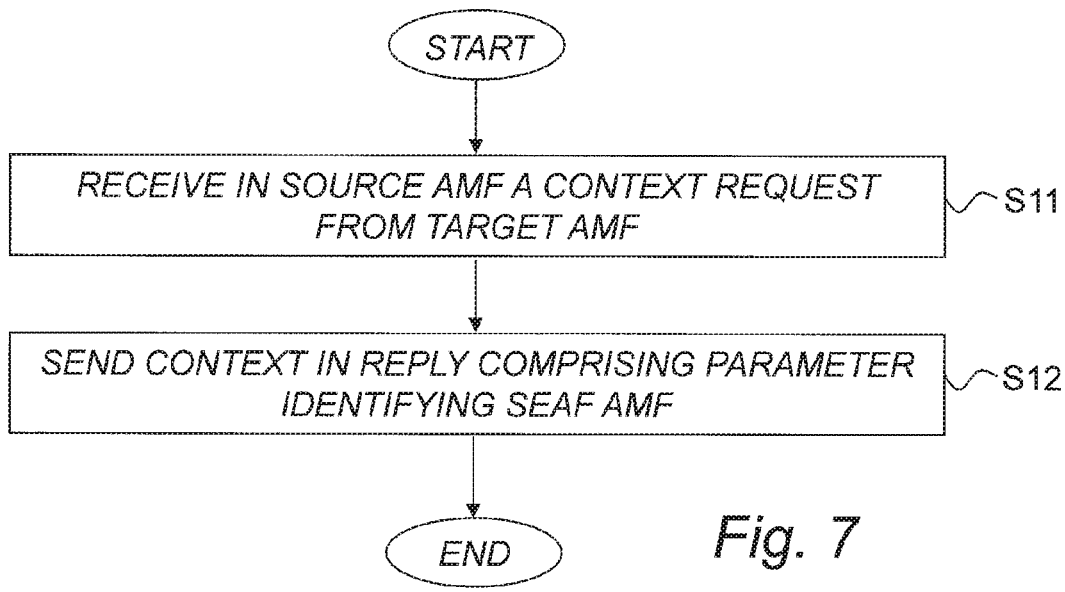
FIG. 7 illustrates a flow diagram of steps of another embodiment of a method for handling change of serving AMF for a UE, in the role of a source AMF.

Matching procedures are performed in the source AMF. FIG. 7 illustrates a flow diagram of steps of an embodiment of a method for supporting handling of change of serving AMF for a UE. In step S11, a context request is received in a source AMF from a target AMF. In step S12 a context is sent in reply from the source AMF to the target AMF. The context comprises a parameter which identifies a SEAF AMF, which SEAF AMF keeps a key, which is shared with the UE.

The following sections show different options to realize the security context handling during AMF change. Mind that the source AMF in the following figures may be the SEAF AMF or it could be a separate one, as shown in the figures as a result of mobility procedure based on any of the alternatives shown.

Figure 8:
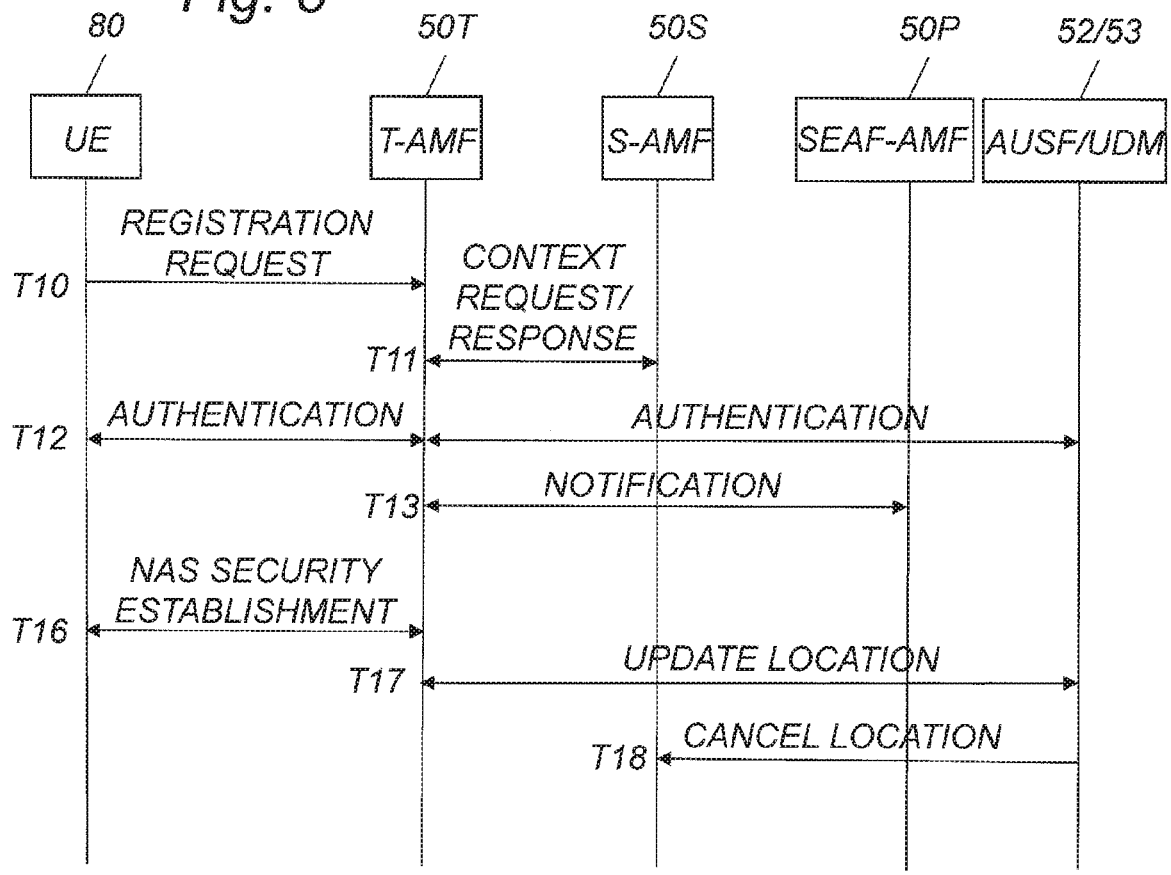
FIG. 8 describes signaling of an embodiment of re-authentication during an AMF change.

Signaling connected to one scene of an embodiment of a change of serving AMF is illustrated in FIG. 8.

The UE 80 sends a registration request T10 to the target AMF 50T. The UE registration should include any necessary information from the current NAS security context in order for the new AMF, also referred to as the target AMF 50T, to be able to identify the old serving AMF, i.e. the source AMF 50S.

The target AMF 50T receives T10 the registration request from the UE and sends a context request T11 to the source AMF 50S which does reply accordingly. The context includes the additional PGUTI parameter which identifies the SEAF AMF 50P.

In this scene of the embodiment, the target AMF 50T decides to run a new authentication T12 leading to the establishment of a new Kseaf. The decision is preferably based on the situation, e.g. location, of the source AMF 50S and the SEAF AMF 50P being associated with the PGUTI parameter. As a consequence, the target AMF 50T becomes also the new SEAF AMF for this UE 80. As a consequence, a new Kseaf' is established. The corresponding PGUTI could be for example chosen to be the first GUTI allocated by this target AMF. As the PGUTI is send over the air and is only passed between AMFs there is no need for dedicated reallocation procedures.

The target AMF 50T may optionally notify T13 the (previous) SEAF AMF 50P so that the latter can safely dispose of the old Kseaf and the corresponding security context. In order to avoid such additional signaling, it could be the case that a SEAF context is only maintained for a certain period of time once the UE 80 leaves the SEAF AMF 50P. In this manner, the data will be removed automatically once the defined period elapses.

A NAS security establishment T16 is performed. A new CN key is derived and then taken into use via an SMC like procedure between the target AMF 50T and the UE 80.

Finally, the target AMF 50T will perform an Update Location T17 to register itself in the UDM 53 of the HPLMN and to download the subscription profile of the authenticated user. Based on this, the UDM 53 will send a Cancel Location T18 to the source AMF 50S.

The UE applies key procedures according to the authentication strategy.

In another scene of an embodiment, the target AMF continues using the security keys received from the source AMF. This scenario would not require any interaction with the SEAF AMF and is in its final parts similar to legacy mechanism. As illustrated in FIG. 9, in a CN key transfer, the UE 80 sends a registration request T10. The UE registration should include any necessary information from the current NAS security context in order for the target AMF 50T to be able to identify the old serving AMF, i.e. the source AMF 50S.

The target AMF 50T sends a context request T11 to the source AMF 50S which does reply accordingly. The context includes the additional PGUTI parameter which identifies the SEAF AMP 50P.

Based on the PGUTI parameter and the knowledge of the identity of the source node, a decision is made to continue with a CN key transfer. Optionally and for example in case an algorithm change is required by the target AMF 50T, then an SMC like procedure T16 is run in order to take the chosen new algorithms into use.

Finally, the target AMF 50T will perform an Update Location T17 to register itself in the UDM 53 of the HPLMN and to download the subscription profile of the authenticated user. Based on this, the UDM 53 will send a Cancel Location T18 to the source AMF 50S.

The UE applies key procedures according to the authentication strategy.

In another scene of an embodiment, a new key derivation is decided on. The target AMF 50T queries the SEAF AMF 50P in order to obtain a new CN key as illustrated in FIG. 10.

To this end, the UE 80 sends a registration request T10. The UE registration should include any necessary information from the current NAS security context in order for the target AMF 50T to be able to identify the old serving AMF, i.e. the source AMF 50S.

The target AMF 50T sends a context request T11 to the source AMF 50S which does reply accordingly. The context includes the additional PGUTI parameter which identifies the SEAF AMF 50P.

A decision is made based on the PGUTI parameter and the knowledge of the identity of the source AMF 50S to continue with a key request.

The target AMF 50T sends a key request T14 to the SEAF AMF 50P identified by the PGUTI and the SEAF AMF 50P acts accordingly by deriving a new Kcn from the current Kseaf and including it in the reply. The derivation of this Kcn could be based on a freshness parameter that is included in the reply as well. Further embodiments related to these aspects are described below.

The new CN key is taken into use via an SMC like procedure T16 between the target AMF 50T and the UE 80. In order for the UE 80 to know that a new Kcn is being used, there must be an indication in the SMC like message from the target AMF 50T to the UE 80. Further embodiments related to these aspects are described below.

Finally, the target AMF 50T will perform an Update Location T17 to register itself in the UDM 53 of the HPLMN and to download the subscription profile of the authenticated user. Based on this, the UDM 53 will send a Cancel Location T18 to the source AMF 50S.

The UE applies key procedures according to the authentication strategy.

In a preferred embodiment, all the scenes described in FIGS. 8-10 should be possible to select.

To this end, in a preferred embodiment of a method performed in a target AMF, the authentication strategy in step S4 (FIG. 6) comprises one of:
a transferring of a key between AMFs,
an execution of a new authentication procedure, and
a request of a key from said SEAF AMF.

With reference to the scene of FIG. 8, in one embodiment of a method performed in a target AMF, the method comprises the further step of running a new authentication process in reply to that the authentication strategy being decided to be an execution of a new authentication procedure. The authentication process in turn comprises establishing of a new key by interaction with an AUST. Furthermore, a new parameter, which identifies a SEAF AMF, is created, identifying the target AMF as a new SEAF AMF.

Preferably, the method also comprises the further step of notifying the original SEAF AMF that the target AMF is the new SEAF AMF for the UE.

With reference to the scene of FIG. 9, in one embodiment of a method performed in a target AMF, the method comprises the further step of transferring a CN key between the source AMF and the target AMF in reply to that the authentication strategy is decided to be a transferring of a key between AMFs.

With reference to the scene of FIG. 10, in one embodiment of a method performed in a target AMF, the method comprises the further step of requesting a key in reply to that the authentication strategy is decided to be a request of a key from the SEAF AMF. The requesting of a key in turn comprises sending of a request for a key to the SEAF AMF and receiving of the key from the SEAF AMF.

In a preferred embodiment, the parameter that identifies a SEAF AMF is a GUTI associated with the SEAF AMF.

In a preferred embodiment, the key, which is shared with the UE, is used for deriving of other keys.

In a preferred embodiment, the method comprises the further step of performing a NAS establishment procedure between the target AMF and the UE. The NAS establishment procedure informs the UE about the authentication strategy decided by the target AMF.

Corresponding procedures are performed in the source AMF when necessary.

In a preferred embodiment of a method performed in a source AMF, when the authentication strategy is decided to be a transferring of a key between AMFs (c.f. FIG. 9), the method comprises the further step of transferring a CN key between the source AMF and the target AMF.

In a preferred embodiment, the method performed in a source AMF comprises the further step of retrieving the parameter which identifies a SEAF AMF from a memory.

In a preferred embodiment, the parameter is a GUTI associated with the SEAF AMF.

In a preferred embodiment, the key, which is shared with the UE, is used for deriving of other keys.

Figure 11:
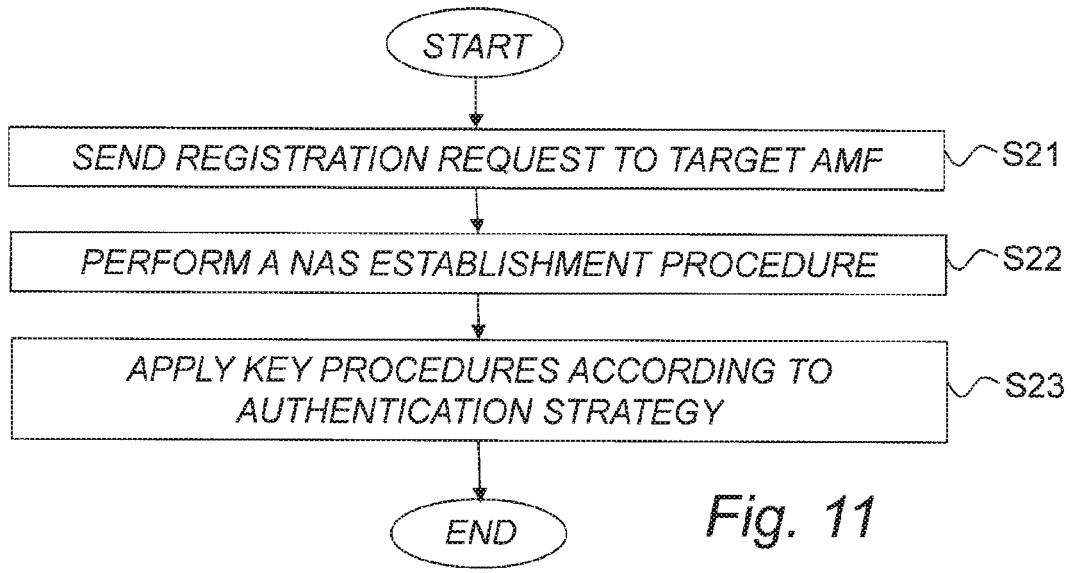
FIG. 11 illustrates a flow diagram of steps of an embodiment of a method for handling change of serving AMF for a UE, in the role of a UE.

The procedures performed in the UE can be illustrated by FIG. 11, in which a flow diagram of steps of an embodiment of a method for handling change of serving AMF for a UE is illustrated. In step S21, a registration request is sent from the UE to a target AMF. Preferably, the registration request comprises information identifying a presently used AMF as a source AMF.

As a result of the procedures in the target AMF an authentication strategy is decided on by the target AMF. In step S22, a NAS establishment procedure is performed between the target AMF and the UE. The NAS establishment procedure informs the UE about the authentication strategy. In step S23, key procedures are applied according to the authentication strategy.

Preferably, the authentication strategy comprises one of a transferring of a key between AMFs, an execution of a new authentication procedure, and a request of a key from a SEAF AMF.

Figure 12:
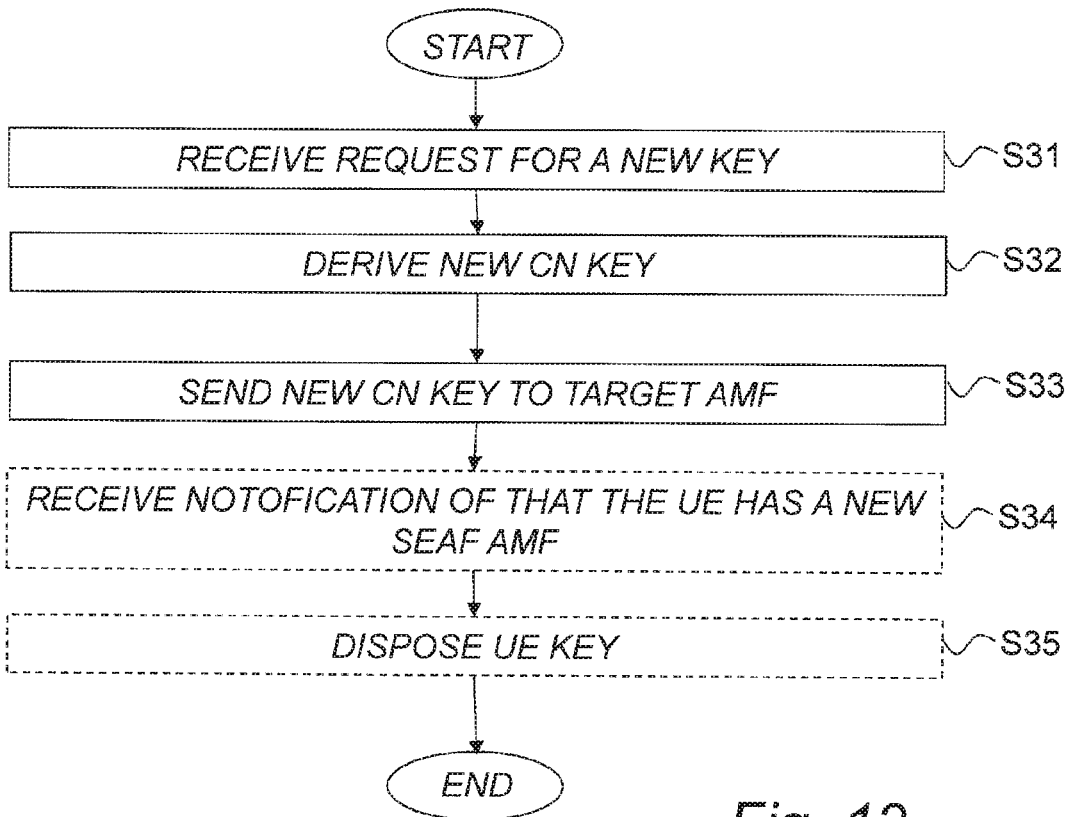
FIG. 12 illustrates a flow diagram of steps of an embodiment of a method for handling change of serving AMF for a UE, in the role of a SEAF AMF.

In some scenes, the SEAF AMF contributes to the solution, see e.g. FIGS. 8 and 10. FIG. 12, illustrates a flow diagram of steps of an embodiment of a method for handling change of serving AMF for a UE, as performed in a SEAF AMF. In step S31, a request for a new key for the UE is received in the SEAF AMF from the target AMF. In step S32, a new CN key is derived in the SEAF AMF from a key that is shared with the UE. In step S33 the new CN key is sent to the target AMF.

In a preferred embodiment, when the scene of FIG. 8 occurs, additional steps are performed in the SEAF AMF. In step S34, a notification from a target AMF is received. The notification informs the SEAF AMF that the UE has a new SEAF AMF. In step S35, the key that is shared with the UE is disposed.

The derivation of the Kcn from the Kseaf could be based on a freshness parameter shared between the UE and the SEAF AMF. Such a parameter could be a counter, a nounce or a timestamp.

In case of a counter, then it could be reset or initialized every time a new Kseaf is established. This counter would be then part of the Kseaf security context. If the initial value is agreed in advance between the UE and the AMF, then there might be no need for transferring the counter parameter alongside the key (in T14 of FIG. 10). The UE would only need to receive some type of a "new key indication" in the SMC message (in T16 of FIG. 10). This could be a Boolean parameter. Depending on this indication, the UE would then increment the counter, derives a new Kcn from Kseaf and use that in step 4. Alternatively, the whole counter value or few of the LSBs are transferred alongside the key and further down to the UE to avoid sync failures.

In case of a flounce or a timestamp, such parameters need to be transferred along the new CN key to the target AMF and then further down to the UE.

As used herein, the non-limiting terms "User Equipment (UE)", "station (STA)" and "wireless communication device" may refer to a mobile phone, a cellular phone, a Personal Digital Assistant (PDA) equipped with radio communication capabilities, a smart phone, a laptop or Personal Computer (PC) equipped with an internal or external mobile broadband modem, a tablet PC with radio communication capabilities, a target device, a device to device UE, a machine type UE or UE capable of machine to machine communication, iPAD, Customer Premises Equipment (CPE), Laptop Embedded Equipment (LEE), Laptop Mounted Equipment (LME), Universal Serial Bus (USB) dongle, a portable electronic radio communication device, a sensor device equipped with radio communication capabilities or the like. In particular, the term "UE", the term "Station" and the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the term "wired device" may refer to any device configured or prepared for wired connection to a network. In particular, the wired device may be at least some of the above devices, with or without radio communication capability, when configured for wired connection.

As used herein, the non-limiting term "network node" may refer to base stations, access points, network control nodes such as network controllers, radio network controllers, station controllers, access controllers, and the like. In particular, the term "base station" may encompass different types of radio base stations including standardized base stations such as Node Bs, or evolved Node Bs (eNB) and also macro/micro/pico radio base stations, home base stations, also known as femto base stations, relay nodes, repeaters, radio access points, Base Transceiver Stations (BTS), and even radio control nodes controlling one or more Remote Radio Units (RRU), or the like.

In the following, the general non-limiting term "communication unit" includes network nodes and/or associated wireless devices.

As used herein, the term "network device" may refer to any device located in connection with a communication network, including but not limited to devices in access networks, core networks similar network structures. The term network device may also encompass cloud-based network devices.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an embodiment of an aspect of the proposed technology there is provided a network node, configured to support handling of change of serving AMF for a UE comprises an AMF configured to send a context request to a source AMF. The AMF is configured to receive a context in reply from the source AMF. The context comprises a parameter which identifies a SEAF AMF, which SEAF AMF keeps a key, which is shared with the UE.

According to an embodiment of an aspect of the proposed technology there is provided a network node, configured to support handling of change of serving AMF for a UE, comprises an AMF configured to receive a context request from a target AMF. The serving AMF is configured to send a context in reply to the target AMF. The context comprises a parameter which identifies a SEAF AMF, which SEAF AMF keeps a key, which is shared with the UE.

According to an embodiment of an aspect of the proposed technology there is provided a network node, configured to handle change of serving AMF for a UE, comprises an AMF configured to receive a request from a target AMF for a new key for the UE. The AMF is further configured to derive a new CN key from a key that is shared with the UE. The AMF is further configured to send the new CN key to the target AMF.

Figure 13:
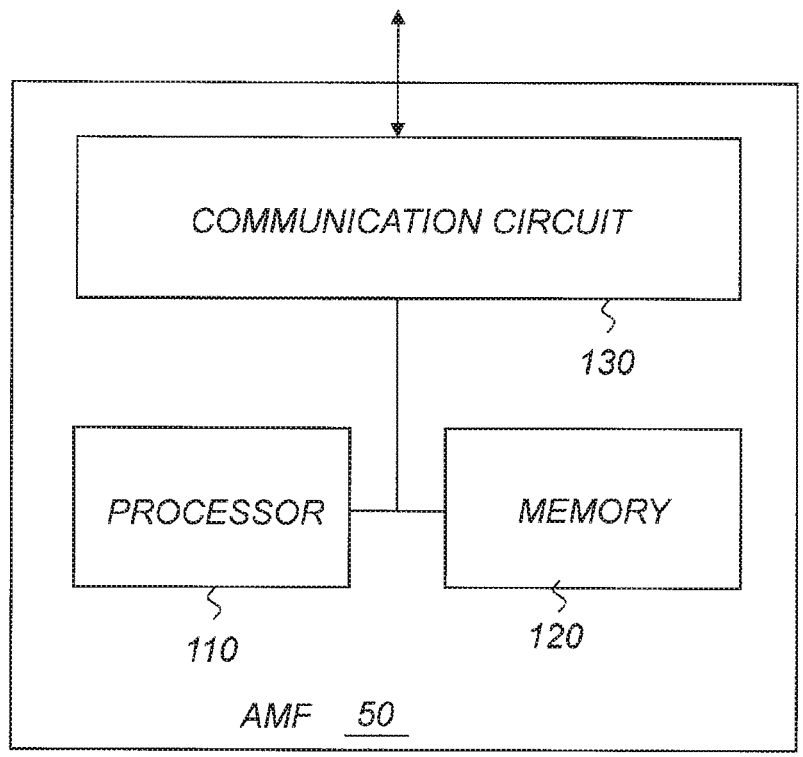
FIG. 13 is a schematic block diagram illustrating an example of an AMF.

FIG. 13 is a schematic block diagram illustrating an example of an AMF 50, based on a processor-memory implementation according to an embodiment. In this particular example, the AMF 50 comprises a processor 110 and a memory 120, the memory 120 comprising instructions executable by the processor 110.

In one embodiment, the instructions, when processed in the processor 110 preferably enables the AMF 50 to decide on an authentication strategy based on a situation of at least one of the source AMF and the SEAF AMF.

In a further embodiment, the deciding is based on a security policy depending on the location of the source AMF and the SEAF AMF.

In one embodiment, the instructions, when processed in the processor 110 preferably enables the AMF 50 to derive a new CN key from a key that is shared with the UE.

The AMF 50 also includes a communication circuit 130. The communication circuit 130 may include functions for wired and/or wireless communication with other devices and/or network nodes in the network. In a particular example, the communication circuit 130 may be based on radio circuitry for communication with one or more other nodes, including transmitting and/or receiving information. The communication circuit 130 may be interconnected to the processor 110 and/or memory 120. By way of example, the communication circuit 130 may include any of the following: a receiver, a transmitter, a transceiver, input/output (I/O) circuitry, input port(s) and/or output port(s).

In one embodiment, the communication circuit 130 is configured to perform the sending of the context request and receiving of the context in reply.

In one embodiment, the communication circuit 130 is configured to perform the receiving of the context request and sending of the context in reply.

In one embodiment, the communication circuit 130 is configured to receive a request from a target AMF for a new key for a UE, and to send a new core network key to the target AMF.

According to an embodiment of an aspect of the proposed technology there is provided a UE for use in a communication network. The UE is configured for sending a registration request to a target AMF. The UE is further configured for performing a NAS establishment procedure between the target AMF and the UE. The NAS establishment procedure informs the UE about an authentication strategy decided by the target AMF. The US is further configured for applying key procedures according to the authentication strategy.

Figure 14:
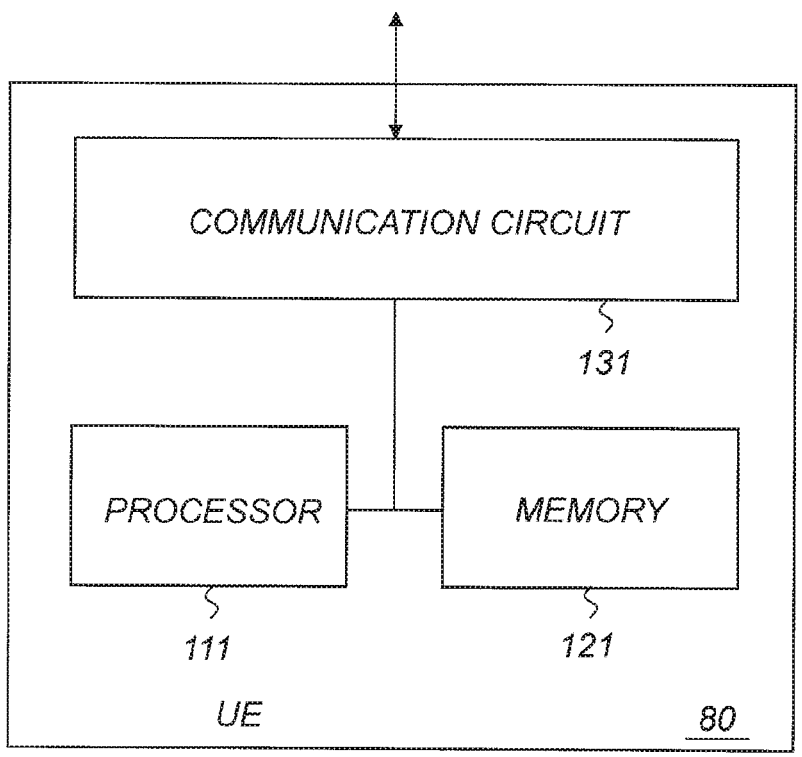
FIG. 14 is a schematic block diagram illustrating an example of a UE.

FIG. 14 is a schematic block diagram illustrating an example of a UE 80, based on a processor-memory implementation according to an embodiment. In this particular example, the UE 80 comprises a processor 111 and a memory 121, the memory 121 comprising instructions executable by the processor 111.

In one embodiment, the instructions, when processed in the processor 110 preferably enables the UE 80 to perform a NAS establishment procedure between the target AMF and the UE, and to apply key procedures according to the authentication strategy.

The UE 80 also includes a communication circuit 131. The communication circuit 131 may include functions for wired and/or wireless communication with other devices and/or network nodes in the network. In a particular example, the communication circuit 131 may be based on radio circuitry for communication with one or more other nodes, including transmitting and/or receiving information. The communication circuit 130 may be interconnected to the processor 111 and/or memory 121. By way of example, the communication circuit 131 may include any of the following: a receiver, a transmitter, a transceiver, input/output (I/O) circuitry, input port(s) and/or output port(s).

In one embodiment, the communication circuit 131 is configured to send a registration request to a target AMF.

Figure 15:
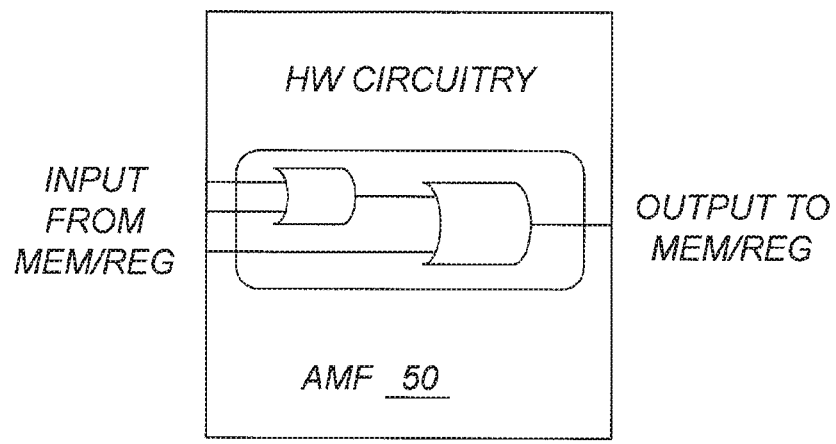
FIG. 15 is a schematic block diagram illustrating another example of an AMF based on a hardware circuitry implementation.

FIG. 15 is a schematic block diagram illustrating another example of an AMF 50, based on a hardware circuitry implementation according to an embodiment. Particular examples of suitable hardware (HW) circuitry include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figure 16:
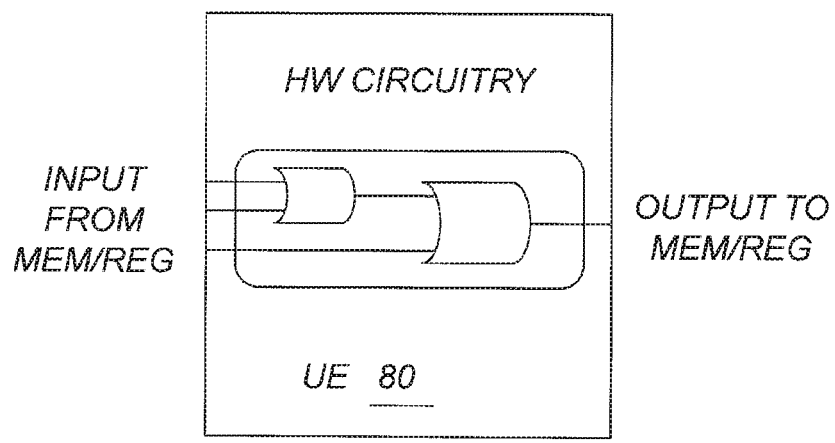
FIG. 16 is a schematic block diagrams illustrating another example of a UE based on a hardware circuitry implementation.

FIG. 16 is a schematic block diagram illustrating another example of a UE 80, based on a hardware circuitry implementation according to an embodiment. Particular examples of suitable hardware (HW) circuitry include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figure 17:
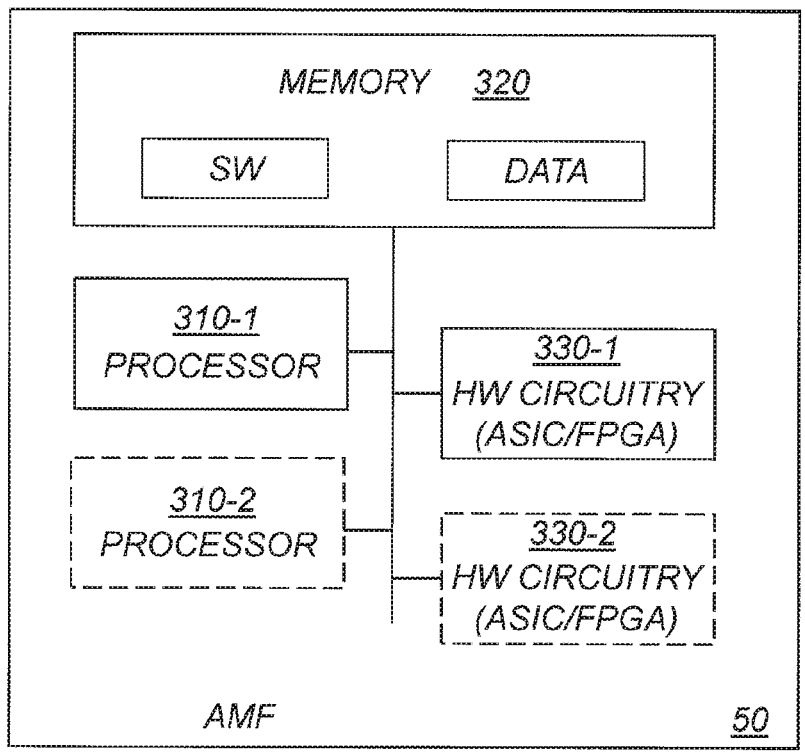
FIG. 17 is a schematic block diagram illustrating yet another example of an AMF based on combination of both processors and hardware circuitry.

FIG. 17 is a schematic block diagram illustrating yet another example of an AMF 50, based on combination of both processor(s) 310-1, 310-2 and hardware circuitry 330-1, 330-2 in connection with suitable memory unit(s) 320. The AMF 50 comprises one or more processors 310-1, 310-2, memory 320 including storage for software and data, and one or more units of hardware circuitry 330-1, 330-2 such as ASICs and/or FPGAs. The overall functionality is thus partitioned between programmed software (SW) for execution on one or more processors 310-1, 310-2, and one or more pre-configured or possibly reconfigurable hardware circuits 330-1, 330-2 such as ASICs and/or FPGAs. The actual hardware-software partitioning can be decided by a system designer based on a number of factors including processing speed, cost of implementation and other requirements.

Figure 18:
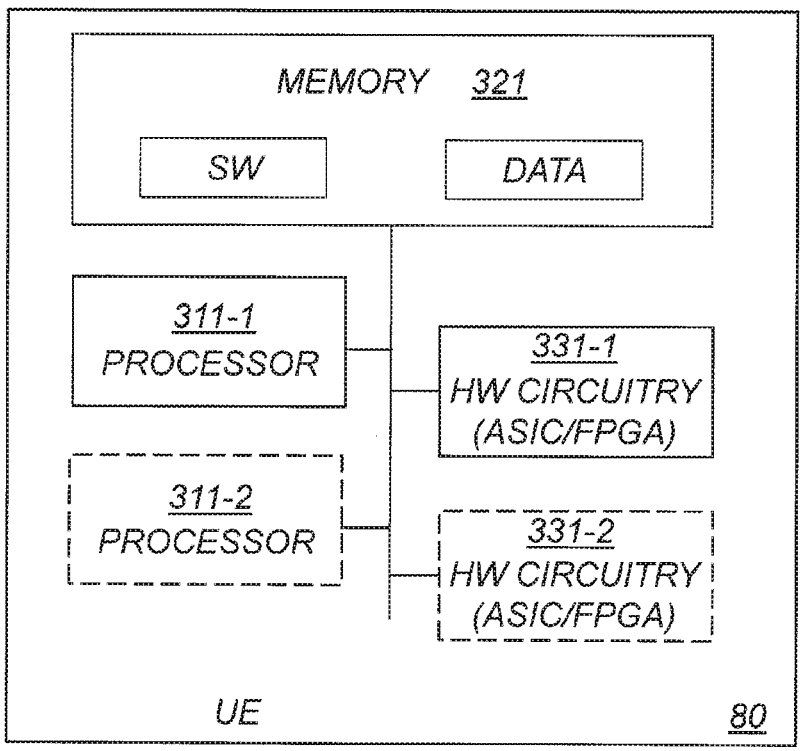
FIG. 18 is a schematic block diagram illustrating yet another example of a UE based on combination of both processors and hardware circuitry.

FIG. 18 is a schematic block diagram illustrating yet another example of a UE 80, based on combination of both processor(s) 311-1, 311-2 and hardware circuitry 331-1, 331-2 in connection with suitable memory unit(s) 321. The UE 80 comprises one or more processors 311-1, 311-2, memory 321 including storage for software and data, and one or more units of hardware circuitry 331-1, 331-2 such as ASICs and/or FPGAs. The overall functionality is thus partitioned between programmed software (SW) for execution on one or more processors 311-1, 311-2, and one or more pre-configured or possibly reconfigurable hardware circuits 331-1, 331-2 such as ASICs and/or FPGAs. The actual hardware-software partitioning can be decided by a system designer based on a number of factors including processing speed, cost of implementation and other requirements.

Alternatively, or as a complement, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 19:
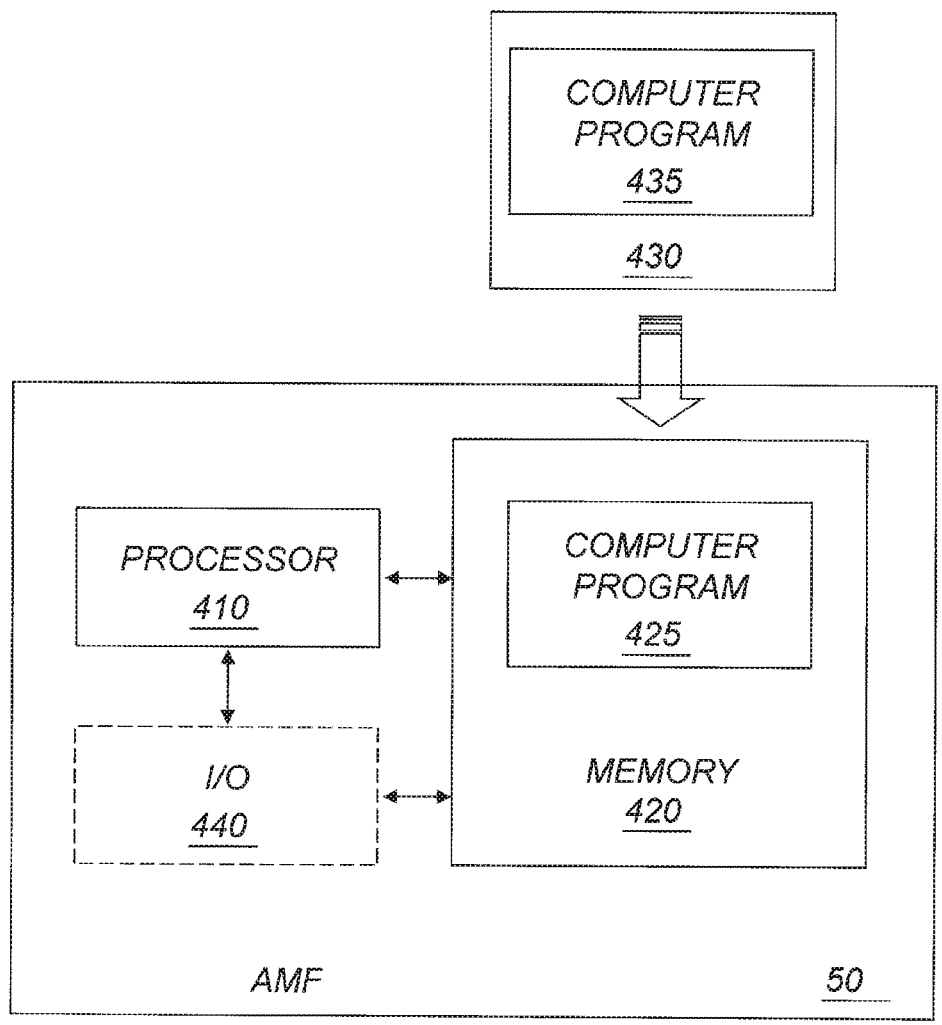
FIG. 19 is a schematic diagram illustrating an example of a computer-implementation of an AMF according to an embodiment.

FIG. 19 is a schematic diagram illustrating an example of a computer-implementation of an AMF 50 according to an embodiment. In this particular example, at least some of the steps, functions, procedures, modules and/or blocks described herein are implemented in a computer program 425; 435, which is loaded into the memory 420 for execution by processing circuitry including one or more processors 410. The processor(s) 410 and memory 420 are interconnected to each other to enable normal software execution. An optional input/output device 440 may also be interconnected to the processor(s) 410 and/or the memory 420 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 410 is thus configured to perform, when executing the computer program 425, well-defined processing tasks such as those described herein.

The processing circuitry does not have to be dedicated to only execute the above-described steps, functions, procedure and/or blocks, but may also execute other tasks.

In a particular embodiment, the computer program 425; 435 comprises instructions, which when executed by at least one processor 410, cause the processor(s) 410 to send a context request to a source AMF, and to receive a context in reply from the source AMF. The context comprises a parameter which identifies a SEAF AMF. The SEAF AMF keeps a key, which is shared with the UE.

In a particular embodiment, the computer program 425; 435 comprises instructions, which when executed by at least one processor 410, cause the processor(s) 410 to receive a context request from a target AMF, and to send a context in reply to the target AMF. The context comprises a parameter which identifies a SEAF AMF, which SEAF AMF keeps a key, which is shared with the UE.

In a particular embodiment, the computer program 425; 435 comprises instructions, which when executed by at least one processor 410, cause the processor(s) 410 to receive a request from a target AMF for a new key for the UE. The computer program 425; 435 comprises further instructions, which when executed by the processor(s) 410, cause the processor(s) 410 to derive a new CN key from a key that is shared with the UE. The, computer program 425; 435 comprises further instructions, which when executed by the processor(s) 410, cause the processor(s) 410 to send the new CN key to the target AMF.

Figure 20:
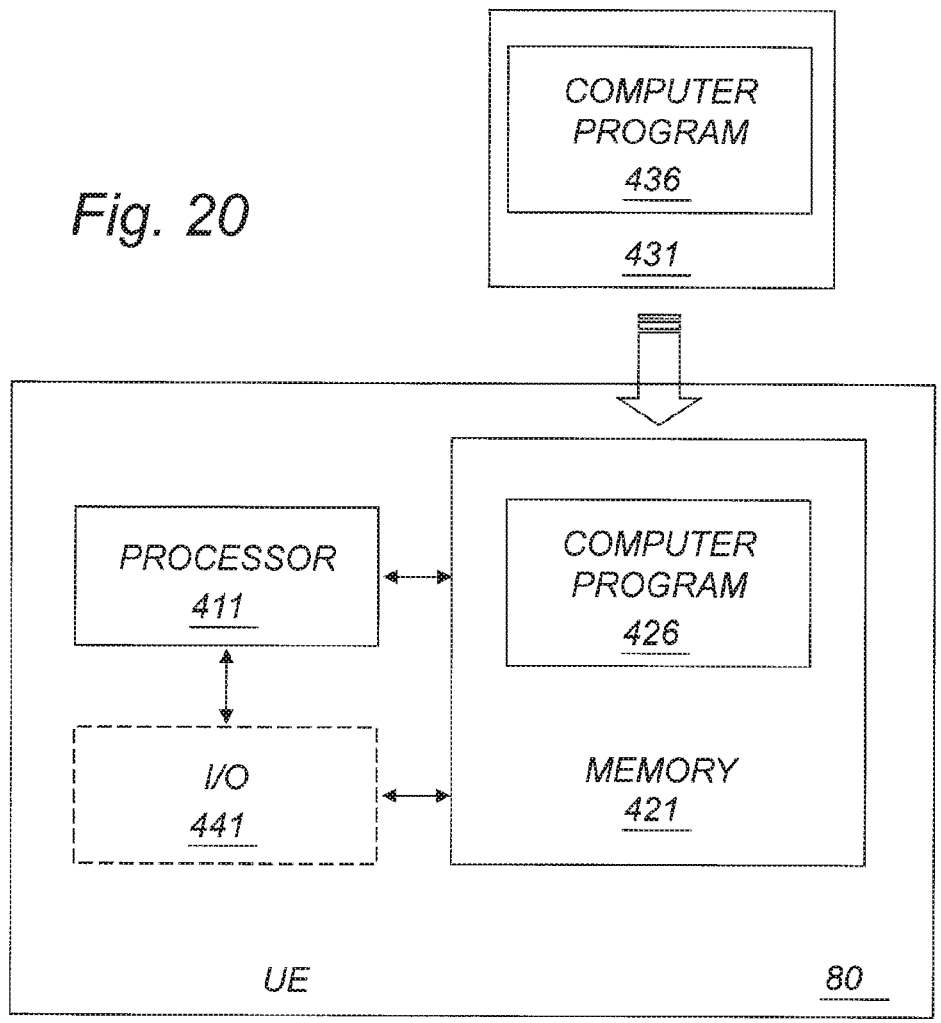
FIG. 20 is a schematic diagram lustrating an example of a computer-implementation of a UE according to an embodiment.

FIG. 20 is a schematic diagram illustrating an example of a computer-implementation of a UE 80 according to an embodiment. In this particular example, at least some of the steps, functions, procedures, modules and/or blocks described herein are implemented in a computer program 426; 436, which is loaded into the memory 421 for execution by processing circuitry including one or more processors 411. The processor(s) 411 and memory 421 are interconnected to each other to enable normal software execution. An optional input/output device 441 may also be interconnected to the processor(s) 411 and/or the memory 421 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 411 is thus configured to perform, when executing the computer program 426, well-defined processing tasks such as those described herein.

The processing circuitry does not have to be dedicated to only execute the above-described steps, functions, procedure and/or blocks, but may also execute other tasks.

In a particular embodiment, the computer program 426; 436 comprises instructions, which when executed by at least one processor 411, cause the processor(s) 411 to send a registration request to a target AMF. The computer program 425; 435 comprises further instructions, which when executed by the processor(s) 411, cause the processor(s) 411 to perform a NAS establishment procedure between the target AMF and the UE. The NAS establishment procedure informs the UE about an authentication strategy decided by the target AMF. The computer program 425; 435 comprises further instructions, which when executed by the processor(s) 411, cause the processor(s) 411 to apply key procedures according to the authentication strategy.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 425, 426; 435 436 may be realized as a computer program product, which is normally carried or stored on a computer-readable medium 420, 421; 430, 431, in particular a non-volatile medium. The computer-readable medium may include one or more removable or non-removable memory devices including, but not limited to a Read-Only Memo (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

Figure 21:
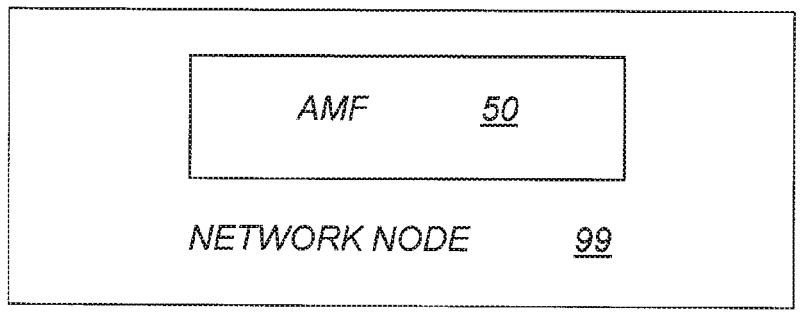
FIG. 21 is a schematic block diagram illustrating an example of a network device comprising an AMF.

FIG. 21 is a schematic block diagram illustrating an example a network node 99 comprising an AMF 50 according to any of the embodiments.

The network device may be any suitable network device in the wireless communication system, or a network device in connection with the wireless communication system. By way of example, the network device may be a suitable network node such a base station or an access point. However, the network device may alternatively be a cloud-implemented network device.

According to another aspect, there is provided a network node 99 in a wireless communication system, wherein the network node comprises an AMF 50 as described herein. The communication unit may be any suitable communication unit in the wireless communication system. By way of example, the communication unit may be a wireless communication device such as a UE, STA or similar end-user device.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program finning on the processor.

The computer program residing in memory may thus be organized as appropriate function modules configured to perform, when executed by the processor, at least part of the steps and/or tasks described herein.

Figure 22:
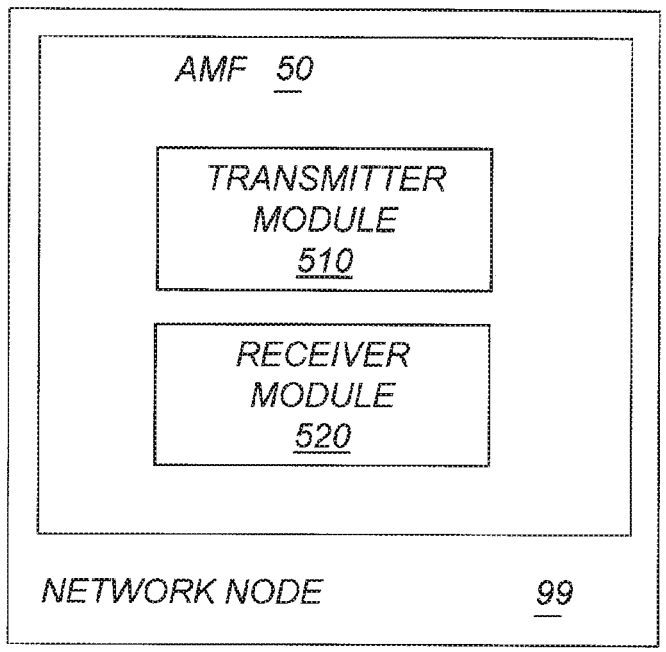
FIG. 22 is a schematic diagram illustrating an example of a network node for handling change of serving AMF for a UE.

FIG. 22 is a schematic diagram illustrating an example of a network node 99 having an AMF 50 for supporting handling of change of serving AMF for a UE.

In one embodiment, the AMF 50 of the network node 99 comprises a transmitter module 510 for sending, from a target AMF, a context request to a source AMF. The network node 99 further comprises a receiver module 520 for receiving, in the target AMF, a context in reply from the source AMF. The context comprises a parameter which identifies a SEAF AMF, which SEAF AMF keeps a key, which is shared with the UE.

In one embodiment, the AMF 50 of the network node 99 comprises a receiver module 520 for receiving, in a source AMF, a context request from a target AMF. The network node 99 further comprises a transmitter module 510 for sending, from the source AMF, a context in reply to the target AMF. The context comprises a parameter which identifies a SEAF AMF, which SEAF AMF keeps a key, which is shared with the UE.

Figure 23:
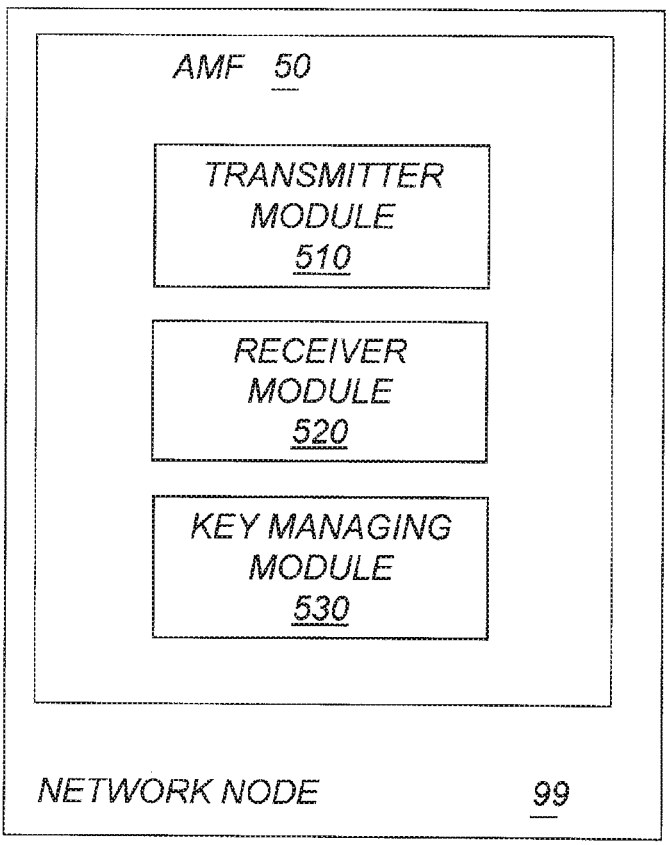
FIG. 23 is a schematic diagram illustrating another example of a network node for handling change of serving AMF for a UE.

FIG. 23 is a schematic diagram illustrating another example of a network node 99 having an AMF 50 for supporting handling of change of serving AMF for a UE.

In one embodiment, the AMF 50 of the network node 99 comprises a receiver module 520 for receiving of a request from a target AMF for a new key for the UE. The AMF 50 further comprises a key managing module 530 for deriving a new CN key from a key that is shared with the UE. The AMF 50 further comprises a transmitter module 510 for sending the new CN key to the target AMF.

Figure 24:
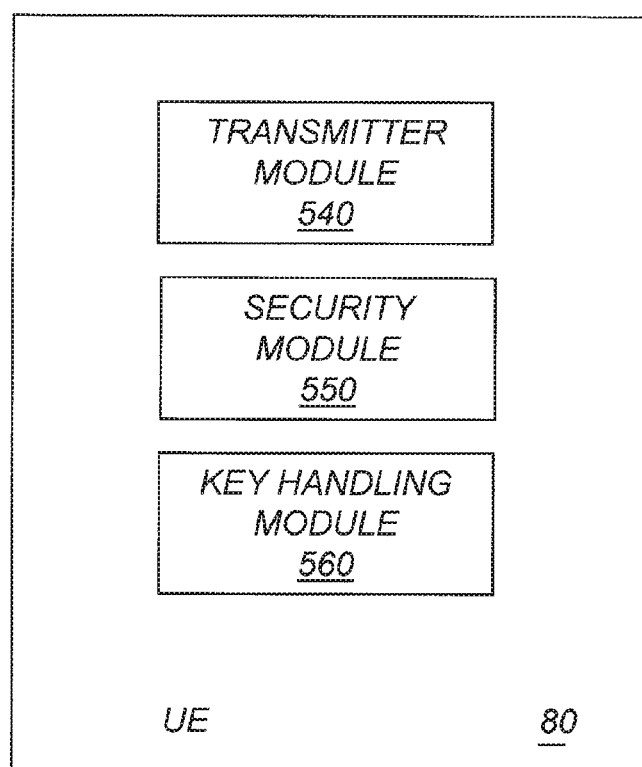
FIG. 24 is a schematic diagram illustrating another example of a UE.

FIG. 24 is a schematic diagram illustrating an example of a UE 80 for use in a communication network. In one embodiment, the UE 80 comprises a transmitter module for sending of a registration request to a target AMF. The UE 80 further comprises a security module for performing a NAS establishment procedure between the target AMF and the UE. The NAS establishment procedure informs the UE about an authentication strategy decided by the target AMF. The UE 80 further comprises a key handling module for applying key procedures according to the authentication strategy.

Alternatively it is possible to realize the module(s) in FIGS. 22-24 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

Figure 25:
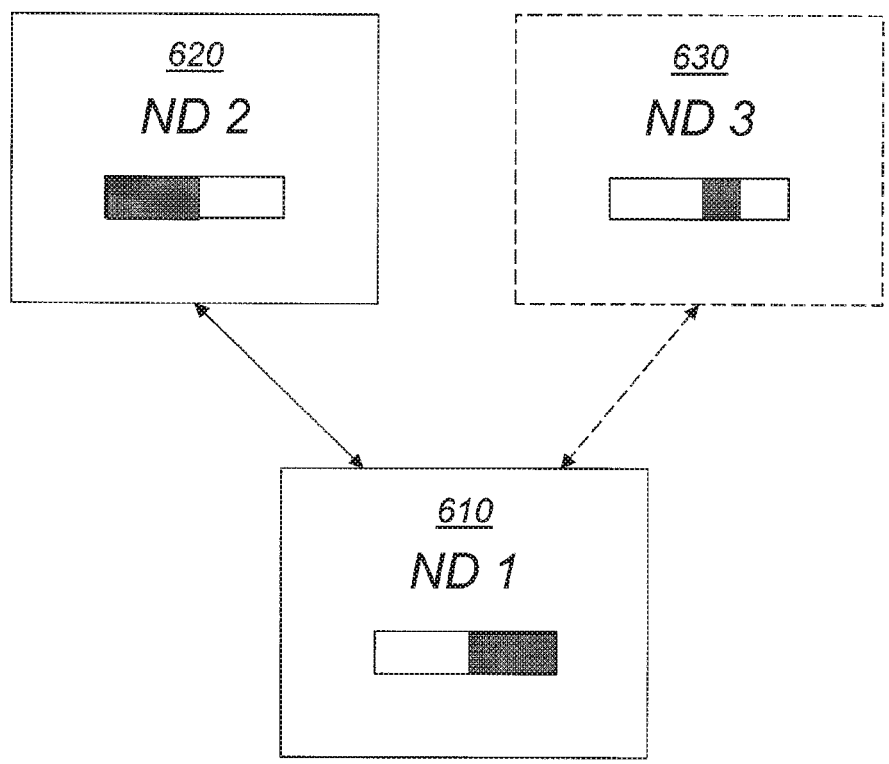
FIG. 25 is a schematic diagram illustrating an example of cloud implementations.

FIG. 25 is a schematic diagram illustrating an example of how functionality can be distributed or partitioned between different network devices in a general case. In this example, there are at least two individual, but interconnected network devices, ND1 and ND2, with reference numerals 610 and 620, respectively, which may have different functionalities, or parts of the same functionality, partitioned between the network devices 610 and 620. There may be additional network devices, such as ND3, with reference numeral 630, being part of such a distributed implementation. The network devices 610-630 may be part of the same wireless communication system, or one or more of the network devices may be so-called cloud-based network devices located outside of the wireless communication system.

Figure 26:
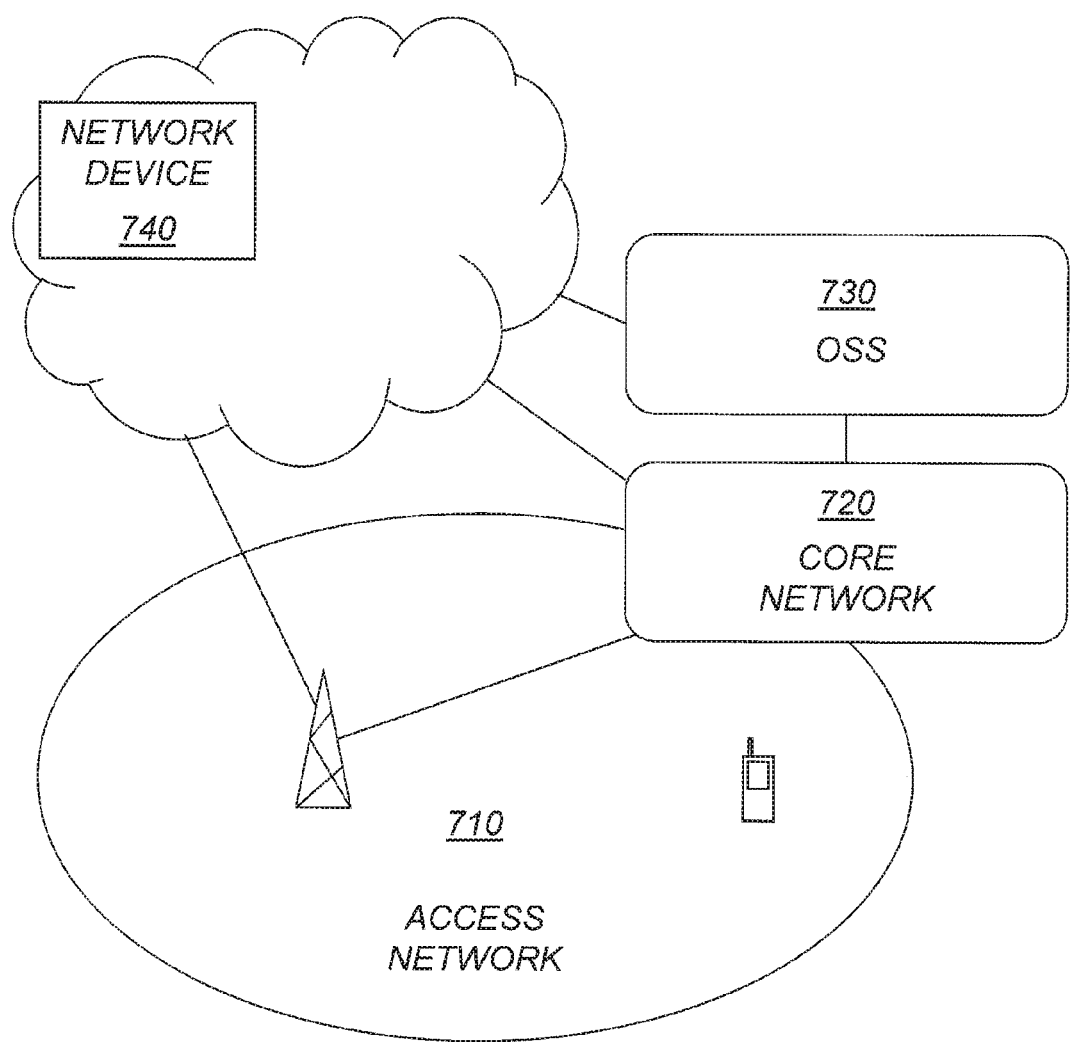
FIG. 26 is a schematic diagram illustrating an example of a wireless communication system.

FIG. 26 is a schematic diagram illustrating an example of a wireless communication system, including an access network 710 and/or a core network 720 and/or an Operations and Support System (OSS), 730 in cooperation with one or more cloud-based network devices 740. Functionality relevant for the access network 710 and/or the core network 720 and/or the OSS system 730 may be at least partially implemented for execution in a cloud-based network device 740, with suitable transfer of information between the cloud-based network device and the relevant network nodes and/or communication units in the access network and/or the core network and/or the OSS system.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software provide one or more of the features or functions disclosed herein.

A general purpose network device may use Common Off-The-Shelf (COTS) processors and a standard OS, for execution of software configured to provide one or more of features functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a Wireless Network Interface Controller (WNIC) or through plugging in a cable to a physical port connected to a Network Interface Controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s), Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software containers) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

ABBREVIATIONS

AKA Authentication and Key Agreement
AN Access Network
AMF Access and Mobility Management Function
ARQ Automatic Repeat request ASIC Application Specific Integrated Circuits
AUSF Authentication Server Function
BTS Base Transceiver Stations
CD Compact Disc
CN Core Network
COTS Common Off-The-Shelf
CPE Customer Premises Equipment
CPU Central Processing Units
CS Circuit-Switched
DSP Digital Signal Processors
DVD Digital Versatile Disc
eNB evolved Node B
EPC Evolved Packet Core
EPS Evolved Packet System
eUTRAN Evolved UTRAN
FPGA Field Programmable Gate Arrays
GGSN Gateway GPRS Support Node
GUTI Globally Unique Temporary ID
HDD Hard Disk Drive
HLR Home Location register
HPLMN Home public land mobile network
HSPA High Speed Packet Access
HSS Home Subscriber Server
HW hardware
I/O input/output
IoT Internet of Things
LEE Laptop Embedded Equipment
LME Laptop Mounted Equipment
LTE Long Term Evolution
MEM memory units
MME Mobility Management Entity
MMF Mobility Management Function
MSC Mobile Switching Center
NAS Non-Access Stratum
ND Network Device
NFV Network Function Virtualization
NG Next Generation.
NI Network Interfaces
NIC Network Interface Controller
OFDMA Orthogonal Frequency Division Multiple Access
OS Operating System
OSS Operations and Support System
PC Personal Computer
PDA Personal Digital Assistant
PDN Packet Data Network Gateway
PGUTI Primary GUTI
PLC Programmable Logic Controllers
PS Packet-Switched
PSTN Public Switched Telephone Network
QoS Quality of Service
RAM Random Access Memory
RAN Radio Access Network
REG registers
RNC Radio Network Controller
ROM Read-Only Memory
RRM Radio Resource Management
RRU Remote Radio Units
SAE System Architecture Evolution
SEAF Security Anchor Function
SG Serving Gateway
SGSN Serving GPRS Support Node
SMC Security Mode Command
SMF Session Management Function
STA Station
SW software
UDM User data management
UE User Equipment
UICC Universal Integrated Circuit Card
UMTS Universal Mobile Telecommunications System
UP User Plane
USB Universal Serial Bus
UTRAN Universal Terrestrial Radio Access Network
VM Virtual Machine
VMM Virtual Machine Monitor
VNE Virtual Network Element
WCDMA Wideband Code Division Multiple Access
WNIC Wireless Network Interface Controller

What is claimed is:

1. A network node configured for operation as an Access and Mobility Management Function (AMF) for user equipments (UEs) in a wireless communication network, the network node comprising:

communication circuitry configured for communicating directly or indirectly with other AMFs in the wireless communication network; and processing circuitry operatively associated with the communication circuitry and, with respect to the AMF being a targeted AMF for serving a UE currently being served by another, serving AMF in the wireless communication network, the processing circuitry is configured to:

send a context request towards the serving AMF;

receive a context of the UE in reply from the serving AMF, wherein the context identifies which AMF in the wireless communication network currently operates as a SEcurity Anchor Function Access and Mobility Management Function (SEAF-AMF) for the UE, wherein the SEAF-AMF and the UE share a security key resulting from the performance of a primary authentication procedure between the UE and an Authentication Server Function (AUSF) in the wireless communication network;

decide an authentication strategy for the UE, in dependence on a defined security policy, wherein the authentication strategy comprises one of:

reusing one or more derived security keys for protecting communication with the UE, as were used by the serving AMF for the UE and indicated in the context received from the serving AMF;

initiating re-execution of the primary authentication procedure to obtain new derived security keys for the UE; and requesting new derived security keys for the UE from the SEAF-AMF.

2. The network node of claim 1, wherein the processing circuitry is configured to send the context request responsive to receiving a registration request from the UE.

3. The network node of claim 1, wherein the processing circuitry is configured to decide whether to use security keys received from the serving AMF for the UE, based on a location of the serving AMF, or to request new security keys for the UE from the AUSF or the SEAF-AMF.

4. The network node of claim 1, wherein the processing circuitry is further configured to perform a non-access stratum security establishment procedure between the target AMF and the UE, wherein the non-access stratum security establishment procedure informs the UE of the authentication strategy decided by the target AMF.

5. The network node of claim 1, wherein the shared key was used to derive security keys currently in use for protecting User Plane (UP) and Control Plane (CP) communications going between the UE and the wireless communication network.

6. A network node configured for operation as an Access and Mobility Management Function (AMF) for user equipments (UEs) in a wireless communication network, the network node comprising:
- communication circuitry configured for communicating directly or indirectly with other AMFs in the wireless communication network; and
- processing circuitry operatively associated with the communication circuitry and, with respect to the AMF being a serving AMF for a UE operating in the wireless communication network, the processing circuitry is configured to:
  - receive a context request from another AMF, the other AMF being targeted as a new serving AMF for the UE; and
  - send a context of the UE to the target AMF, in reply to the context request, wherein the context identifies which AMF in the wireless communication network currently operates as a SEcurity Anchor Function Access and Mobility Management Function (SEAF-AMF) for the UE, wherein the SEAF-AMF and the UE share a security key resulting from the performance of a primary authentication procedure between the UE and an Authentication Server Function (AUSF) in the wireless communication network, wherein, either in the context or in association with sending the context, the processing circuitry is further configured to send one or more derived security keys to the target AMF, wherein the one or more derived security keys are currently in use for protecting communication between the UE and the wireless communication network, and wherein the one or more derived security keys are derived from the shared security key.

7. A network node configured for operation as an Access and Mobility Management Function (AMF) in the wireless communication network, the network node comprising:
- communication circuitry configured for communicating directly or indirectly with other AMFs in the wireless communication network; and
- processing circuitry operatively associated with the communication circuitry and configured to:
  - initiate a primary authentication procedure of a User Equipment (UE), as between the UE and an Authentication Server Function (AUSF) in the wireless communication network, in response to receiving a registration request originated by the UE;
  - receive a security key from the AUSF in conjunction with successful authentication of the UE by the AUSF;
  - store the security key as a shared key for the UE, wherein the UE also retains a copy of the shared key, and wherein the shared key provides a basis for deriving one or more derived security keys for protecting communication between the UE and the wireless communication network;
  - perform an update location procedure with respect to a Unified Data Management (UDM) node in the wireless communication network, and thereby registering the AMF as a SEcurity Anchor Function (SEAF) AMF for the UE; and
  - indicate completion of registration to the UE.

8. The network node of claim 7, further comprising receiving a request from another AMF in the wireless communication network, requesting an updated derivation of the one or more derived keys, the other AMF being targeted as a new serving AMF for the UE, and deriving a new security key or keys to replace the one or more derived security keys, from the shared security key, and providing the new security key or keys to the targeted AMF.

* * * * *